United States Patent [19]
Garshelis

[11] Patent Number: 5,195,377
[45] Date of Patent: Mar. 23, 1993

[54] MAGNETOELASTIC FORCE TRANSDUCER FOR SENSING FORCE APPLIED TO A FERROMAGNETIC MEMBER USING LEAKAGE FLUX MEASUREMENT

[76] Inventor: Ivan J. Garshelis, 176 S. Mountain Rd., Pittsfield, Mass. 01201

[21] Appl. No.: 705,645

[22] Filed: May 24, 1991

Related U.S. Application Data

[63] Continuation-in-part of Ser. No. 509,804, Apr. 17, 1990, abandoned.

[51] Int. Cl.$^5$ ............................ G01B 7/24; G01L 1/12; G01R 33/18
[52] U.S. Cl. ................................. 73/779; 73/862.69; 324/209
[58] Field of Search .................. 324/209, 235; 73/862.36, 862.69, 779

[56] References Cited

U.S. PATENT DOCUMENTS

| | | | |
|---|---|---|---|
| 3,311,818 | 3/1967 | Quittner | 324/209 |
| 3,742,357 | 6/1973 | Kubo et al. | 324/209 |
| 3,866,462 | 2/1975 | Fraudin | 324/209 X |
| 4,364,278 | 12/1982 | Horter et al. | 73/862.36 |
| 4,481,470 | 11/1984 | Wallace | 324/209 X |
| 4,572,005 | 2/1986 | Kita | 324/209 X |
| 4,712,432 | 12/1987 | Hochstein et al. | 324/209 X |
| 4,805,466 | 2/1989 | Schiessle et al. | 73/862.36 |
| 4,814,705 | 3/1989 | Saunderson | 324/235 X |
| 4,970,463 | 11/1990 | Wolf et al. | 324/207.2 |

*Primary Examiner*—Gerard R. Strecker
*Attorney, Agent, or Firm*—Sixbey, Friedman, Leedom & Ferguson

[57] ABSTRACT

A force transducer for providing a signal indicative of, and a method for sensing, the magnitude of an external force applied to a ferromagnetic member, the external force causing tensile and/or compressive stresses to arise in the member, comprising a permanent magnet for creating a magnetic field and a sensor, such as a Hall effect or magnetoresistive device, for sensing the magnetic field intensity at the sensor. The member is positioned for conducting a portion of the magnetic flux therethrough, the amount of member-conducted magnetic flux being a function of the stressed condition of the member and of the applied force creating the stressed condition. The sensor senses only a portion of the flux not conducted through the member (leakage flux) and means are provided for converting the sensed leakage flux into a signal proportional to the magnitude of the force applied to the member. In one preferred form the member is positioned between the permanent magnet and the sensor. In another form the sensor is positioned on the same side of the member as the permanent magnet.

15 Claims, 24 Drawing Sheets

UNSTRESSED    STRESSED

FIG. 24
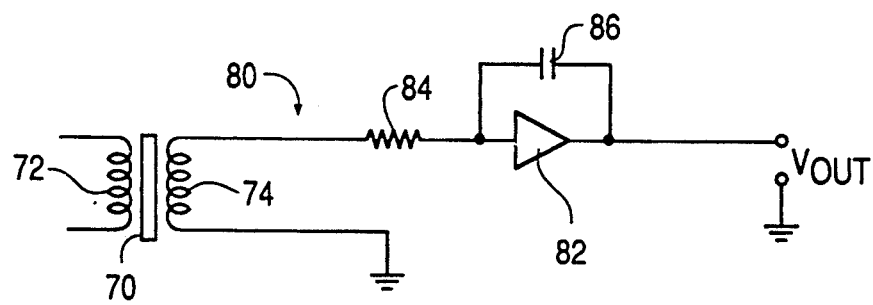
FIG. 25
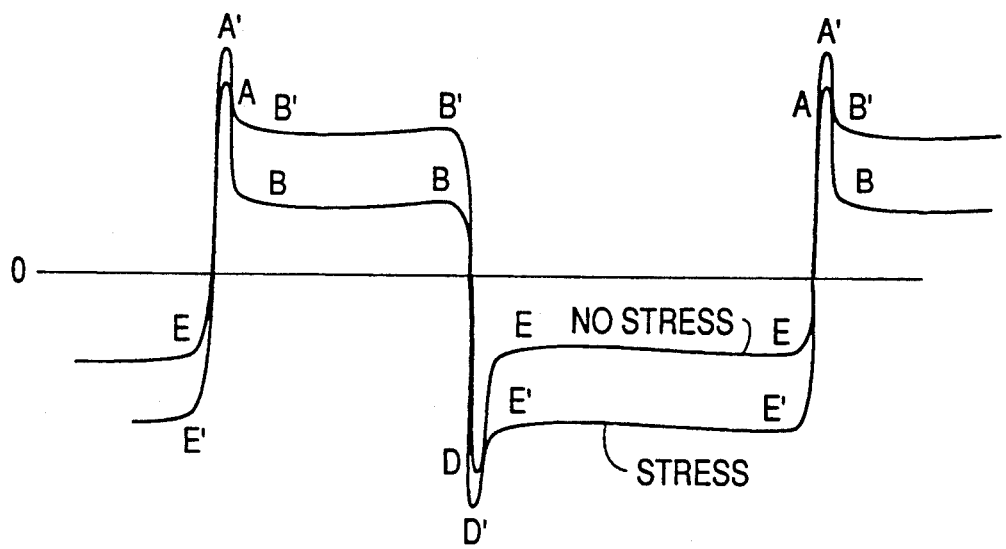
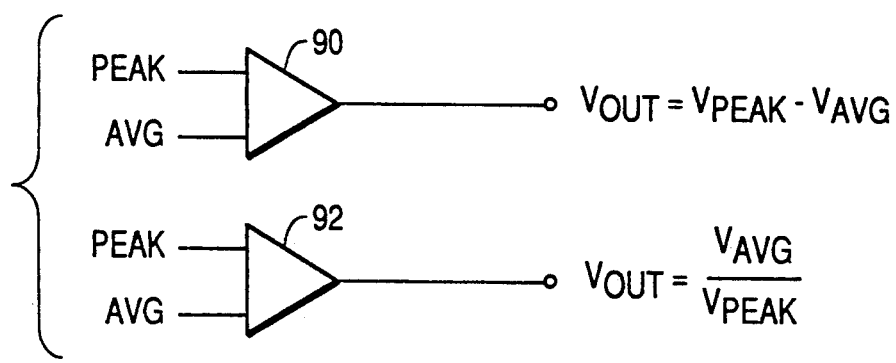
FIG. 26

HYSTERESIS (%) = $\frac{(U-L)}{M} \times 100$

HYSTERESIS (%) = $\frac{(U-L)}{M} \times 100$

HYSTERESIS (%) = $\frac{(U-L)}{M} \times 100$

HYSTERESIS (%) = $\frac{(U-L)}{M} \times 100$

MAGNETOELASTIC FORCE TRANSDUCER FOR SENSING FORCE APPLIED TO A FERROMAGNETIC MEMBER USING LEAKAGE FLUX MEASUREMENT

CROSS-REFERENCE TO RELATED APPLICATIONS

This is a continuation-in-part of copending application Ser. No. 07/509,804, filed Apr. 17, 1990, now abandoned.

TECHNICAL FIELD

The present invention relates to sensors and methods for sensing force related parameters and, more particularly, to sensors and methods for sensing the influence of stress anisotropy on the magnetic properties of ferromagnetic members.

BACKGROUND ART

The use of the magnetic properties of ferromagnetic members for sensing force related parameters has, in large part, been confined to the sensing and measurement of the torque applied to a rotating shaft. Although, the sensing and measurement of torque in an accurate, reliable and inexpensive manner has been a primary objective of workers for several decades, only in the last few years have there been breakthroughs in the design and development of inexpensive, non-contact torque sensing devices which are capable of continuous torque measurements over extended periods of time. See, e.g., U.S. Pat. No. 4,760,745—Garshelis. In addition, magnetic properties have been used for sensing tensile and compressive loads, pressure, vibration and acceleration. See, e.g., U.S. Pat. Nos. 4,802,368 and 4,875,709.

Most of the recent work in the design and development of magnetoelastic torque and other force sensors has been an outgrowth of the well known principle that the permeability of magnetic materials changes due to applied stress. For example, when a torsional stress is applied to a cylindrical shaft of magnetostrictive material, each element in the shaft is subjected to a shearing stress. This shearing stress may be expressed in terms of a tensile stress and an equal and perpendicular compressive stress with the magnitude of each stress being directly proportional to the distance between the shaft axis and the element. The directions of maximum tension and compression occur along tangents to 45° left-handed and 45° right-handed helices about the axis of the shaft. The effect of the torque is to increase the magnetic permeability in directions parallel to one of the helices and, correspondingly, to decrease the magnetic permeability in directions parallel to the other of the helices. As a result, the voltage induced in pickup or measuring coils surrounding the shaft increases or decreases. Inasmuch as the permeability being sensed doesn't change very much, the difference in magnitude of the induced voltages, which is proportional to the torsional stress applied to the shaft, is used as the indicator of permeability change. A similar measurement technique is used in other force sensors, wherein an applied force creates compressive and tensile stresses which alter the permeability in an appropriate ferromagnetic element to produce an electrical signal which is proportional to the applied force.

The permeability change upon which the operation of these magnetoelastic torque transducers and other force sensors is based is more specifically termed the "average permeability". To better understand what is meant by "average permeability" reference is had to FIG. 1 which illustrates a major hysteresis loop of a typical ferromagnetic material subjected to a bipolar cyclic magnetization. The hysteresis loop is a plot of applied magnetic field (H) against magnetic flux density (B) (a comparable graphical relationship would result if magnetization or intrinsic flux density (M) was plotted as the ordinate since B and M are related by the equation B=H+4M). Point A on the hysteresis loop of FIG. 1 corresponds to the peak magnetization at the maximum applied field. After the applied field has been removed such that it no longer influences the magnetization, i.e., the applied field is zero, the magnetization drops to its remanent value, corresponding to B. Likewise, point D corresponds to the peak magnetization at the maximum opposite applied field. However, after this opposite applied field has been removed such that it no longer influences the magnetization, the magnetization drops to its remanent value corresponding to E. The slope of the line DOA is the average permeability.

To better understand the significance of average permeability it is helpful to understand that the ferromagnetic hysteresis loop (FIG. 1) is probably the most fundamental expression of magnetic ordering. This complex phenomenon involves microscopic parameters such as exchange interactions, magnetocrystalline anisotropy, magnetostriction, etc., and macroscopic parameters such as domains, magnetic domain wall dynamics, magnetostatic energy, etc., and results in a process where the magnetic induction is not uniquely defined for a single value of the applied field.

In 1963, A. Globus proposed a simple model for magnetization processes in polycrystalline materials. In this model, the sample is represented by a spherical grain, divided into two 180° magnetic domains by a Bloch-type magnetic domain wall, designated "B" in FIG. 2. If no external field is applied, the wall is pinned to the grain boundary in a diametrical position and no net magnetization exists. A low applied field leads to a bowing of the wall which behaves like an elastic membrane against the "pressure" of the external field. The bowing of the wall is a reversible process and accounts for the reversible magnetization range (low fields) in the magnetization (M) versus applied field (H) plot. The more horizontal portions of the hysteresis loop follow from reversible wall bowing and domain vector rotation. For higher applied fields, the wall is depinned and displaced within the grain. The more vertical portions of the hysteresis loop follow from irreversible depinning and displacement of domain wall position. The field for which the depinning occurs is the "critical" field $H_{cr}$ and represents the boundary between reversible (initial permeability) and irreversible (hysteresis) processes. For $H > H_{cr}$, there exists an equilibrium position for which the wall is again pinned. If the applied field is eliminated, the wall remains at the same position and recovers its plane shape (point B in FIG. 3). This accounts for the remanent magnetization. In order to obtain an hysteresis loop an opposite field has to be applied. At first, the wall is only bowed, until the field reaches the value of the critical field for the new position of the wall. The wall is then depinned and pushed to a new position in the other side of the grain (point D in FIG. 3). This position is again obtained for an equilibrium between the pinning force and the force due to the magnetic pressure of the applied field. By symmetry, the hysteresis loop can be constructed and the qualitative effect of an alternate field can be seen easily.

For a grain under stress all domain walls will be stiffened by the addition of stress anisotropy along some principal stress direction. One result of this is that permeability diminishes. Another result of applied stress is that it alters the effective field. This is due to the "cosine effect", i.e., as the stress anisotropy rotates the domain magnetizations to more nearly align with the applied stress, the angle $\theta$ between the field direction and the magnetization changes and the field becomes more or less effective according to the relationship $H_{eff} = H_{appl} \cos \theta$. As a consequence the grains will experience an increase or decrease in permeability. The average permeability is the sum of these reversible and irreversible permeability sources which, as explained, are affected oppositely by stress, except by the cosine effect. Therefore, average permeability, by its nature, effectively subtracts the reversible change from the irreversible change. The two are in opposite directions and the irreversible change is generally much larger. Thus, the percentage change of either reversible change or irreversible change, considered alone, will always be greater than the percentage change in average permeability. For this reason, average permeability is not a particularly sensitive indicator of stress.

One would be inclined to think that the very substantial effects of stress on the magnetization could be easily detected from the attendant changes in the associated magnetic fields in the space near any one domain. The key word here is "near". Since a domain does not exist in isolation, but borders on at least one other having opposite polarity, and this compensating pair is surrounded by other compensating pairs (generally having different initial orientations or mirror image polarities) it would require precisely placed field sensors, of microscopic size, to be near enough to one domain and simultaneously far enough from others having opposite polarity, to detect a stress dependent net field. The alternative to field sensors which are small enough to intercept the existing flux closure paths is to enlarge the paths sufficiently to ensure that at least some flux passes far enough outside the stressed member to be intercepted by practicable sensing means. To accomplish this the individual domain moments must be made to sum to a net bulk moment. This requires altering the balance between the volumes of domains having upwardly directed and downwardly directed moments. Material in such an unbalanced state is polarized (or magnetized as distinct from demagnetized when the volume weighted, vector sum of the internal moments is zero).

It is, therefore, apparent that despite the many advances in force sensor technology there still exists a need for a force sensor and a method for sensing force related parameters which is more sensitive to changes in stress than are known sensors and methods and which are less sensitive to temperature, magnetic fields and other ambient influences.

SUMMARY OF THE INVENTION

In accordance with one broad aspect of the present invention there is provided a sensor for providing a signal indicative of the magnitude of an external force applied to a member, the external force causing stresses to arise in said member, the sensor comprising means for applying a magnetic field to said member, means for sensing the change, caused by said stresses, in a substantially completely reversible or substantially completely irreversible magnetic characteristic of said member, and means for converting said sensed change to a signal indicative of the magnitude of the force applied to said member.

In accordance with another broad aspect of the present invention there is provided a method for sensing the magnitude of an external force applied to a member, the external force causing stresses to arise in said member, the method comprising applying a magnetic field to said member, sensing the change, caused by said stresses, in a substantially completely reversible or substantially completely irreversible magnetic characteristic of said member, and converting said sensed change to a signal indicative of the magnitude of the force applied to said member.

In accordance with another aspect of the invention the sensed magnetic characteristic is desirably the reversible (AC) permeability and, particularly, the reversible (AC) permeability sensed at the magnetic remanence point.

In still another aspect of the invention the sensed magnetic characteristic is the remanent magnetization or its related characteristic, the remanence ratio.

In yet another aspect of the invention the sensed magnetic characteristic is the d.c. permeability of the stressed member in a constant field.

In accordance with still another aspect of the present invention there is provided a simple magnetoelastic force transducer for sensing uniaxial tension or compression, the transducer relying upon the variation, with applied stress, of the effectiveness with which a core member shields a field detection device from the flux field of a permanent magnet.

BRIEF DESCRIPTION OF THE DRAWINGS

The invention will be better understood from the following description taken in conjunction with the accompanying drawings in which:

FIG. 24 illustrates an exemplary sensing circuit useful in accordance with the present invention.

FIG. 25 is a graphical illustration of flux density against time, including the remanent fall back period of interest, for both a body under stress and a body not under stress.

FIG. 26 is a schematic representation of the various forms of presenting $V_{out}$ from a circuit such as is shown in FIG. 24.

BEST MODE FOR CARRYING OUT THE INVENTION

It is known that the application of an external force (e.g., torque, load, pressure, acceleration) to a ferromagnetic member will create stresses (e.g., tensile, compressive, shear, hydrostatic) and that these stresses affect at least the average permeability of the member. As can be seen from FIG. 4, which illustrates, on the same B-H axes, a major hysteresis loop of a ferromagnetic material having a positive magnetostriction and no Villari reversal and the corresponding hysteresis loop of the same material under axial tension, the effects of tensile stress on the hysteresis loops go well beyond average permeability. Thus,

| | |
|---|---|
| $M_{max}$ at the maximum field increases | $M_{A'} > M_A$ |
| $M_{remanent}$ ($M_R$) increases | $M_{B'} > M_B$ |
| The remanence ratio increases | $M_{B'}/M_{A'} > M_B/M_A$ |
| The coercive force ($H_c$) decreases | $H_{F'} < H_F$ |
| The more vertical portions are steeper | $Slope_{C'F'} > Slope_{C,F}$ |
| The more horizontal portions are more nearly horizontal | $Slope_{A'B'} < Slope_{AB}$ |
| The corners between horizontal and vertical limbs of the hysteresis loops are sharper and occur at | $Slope_{D'E'} < Slope_{DE}$ |

-continued

| lesser values of H | |
|---|---|
| Average permeability ($\mu_{avg}$) increases | Slope$_{D'O A'}$ > Slope$_{DOA}$ |

Now, remembering from the Globus model that the more vertical portions of these hysteresis curves indicate irreversible processes and the more horizontal portions follow from reversible wall bowing and domain vector rotation, it is clear that whole loop permeabilities (average permeability) include both reversible and irreversible processes. However, the effect of stress is to add an additional anisotropic influence to those already existing within the body. Stress anisotropy tends to align the magnetization with one or the other principal stresses against the internal alignment forces arising from crystallinity, texture, directional order, local internal fields and residual stresses. This tendency has no simple consequences on irreversible processes, although the net effect will be to reduce the point-to-point (internal) difference in total local anisotropy and such homogenization will reduce the dispersion of pinning points. Thus, irreversible jumps will tend to take place all at the same value of field. Hence, the sharpening of the corners of the hysteresis loops and the increased verticality of the more vertical portions, both as seen in FIG. 4.

Figure 4:
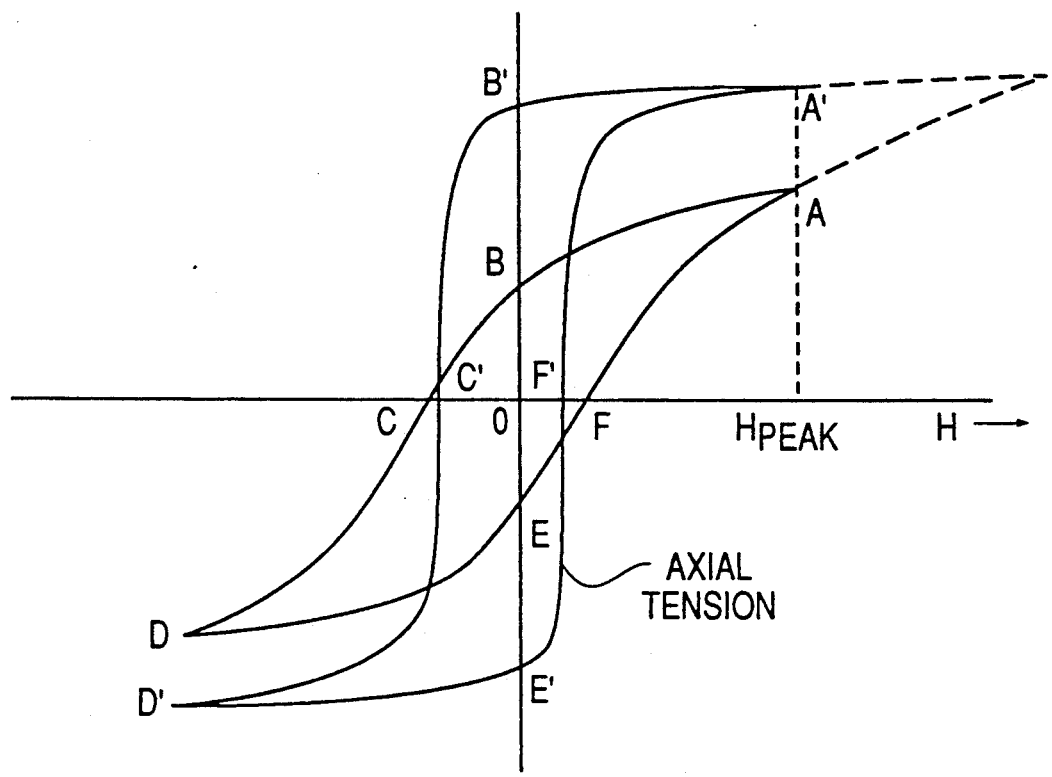
FIG. 4 is a graphical illustration of a major hysteresis loop as in FIG. 1 on the same axes with the corresponding major hysteresis loop for the same ferromagnetic material under tensile stress.

If the major source of wall pinning is non-continuity of, the magnetization at grain boundaries (as is probably the case with low impurity materials such as the Ni maraging steels, which have very few impurities due to the double vacuum melting, low carbon, etc.), then as the magnetization in each grain is brought toward the same axis (the stress direction) the pinning force will be reduced and there will be an expected decrease in coercive force, as can be seen in FIG. 4. Contrarily, as additional anisotropy is added by the stress, the total wall energy per unit area increases since this is proportional to $\sqrt{K}$ where K is the effective anisotropy. The domain walls are, therefore, stiffer and will bow less under the action of a field. This means that the reversible permeability will be reduced by stress, as can be seen in FIG. 4 by the horizontal portions of the loops becoming more horizontal.

The resulting situation, as can be appreciated from FIG. 4, is that stress tends to increase the permeability arising from irreversible processes and tends to decrease the permeability associated with reversible processes. Therefore, average permeability, which effectively subtracts the reversible change from the irreversible change, is not the best indication of change as a result of applied stress.

Figure 1:
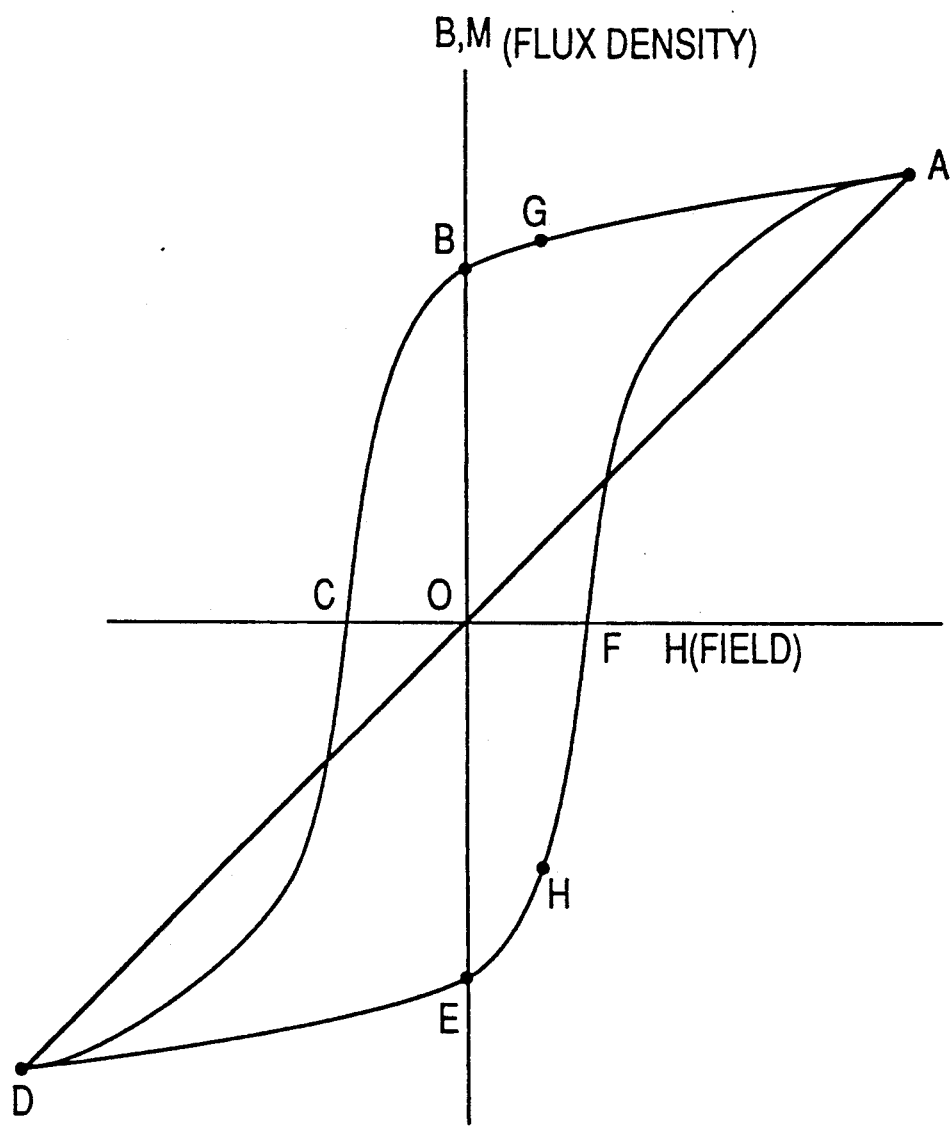
FIG. 1 is a graphical representation of the major hysteresis loop of a ferromagnetic material subjected to a bipolar cyclic magnetization.
Figure 1A:
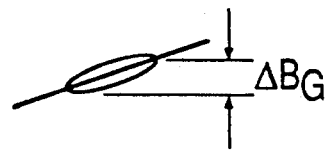
FIG. 1a is a graphical representation of a minor hysteresis loop resulting from applying incremental changes in field at a selected point along the major hysteresis loop of FIG. 1.
Figure 1B:
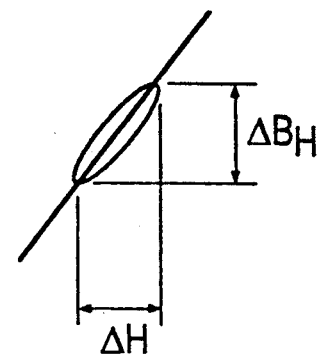
FIG. 1b is a graphical representation of a minor hysteresis loop resulting from applying incremental changes in field at another selected point along the major hysteresis loop of FIG. 1.
Figure 2:
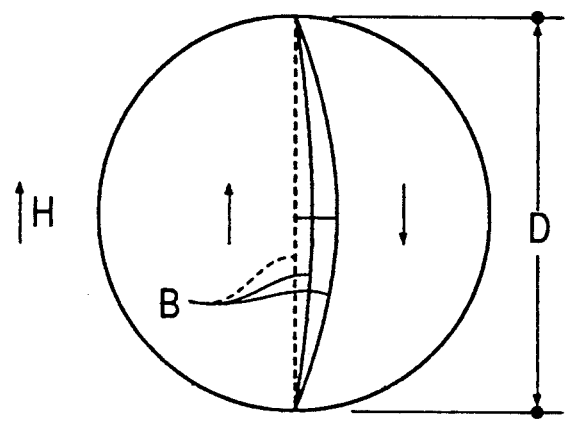
FIG. 2 is an illustration of a spherical grain of a polycrystalline material according to the Globus simplified model.
Figure 3:
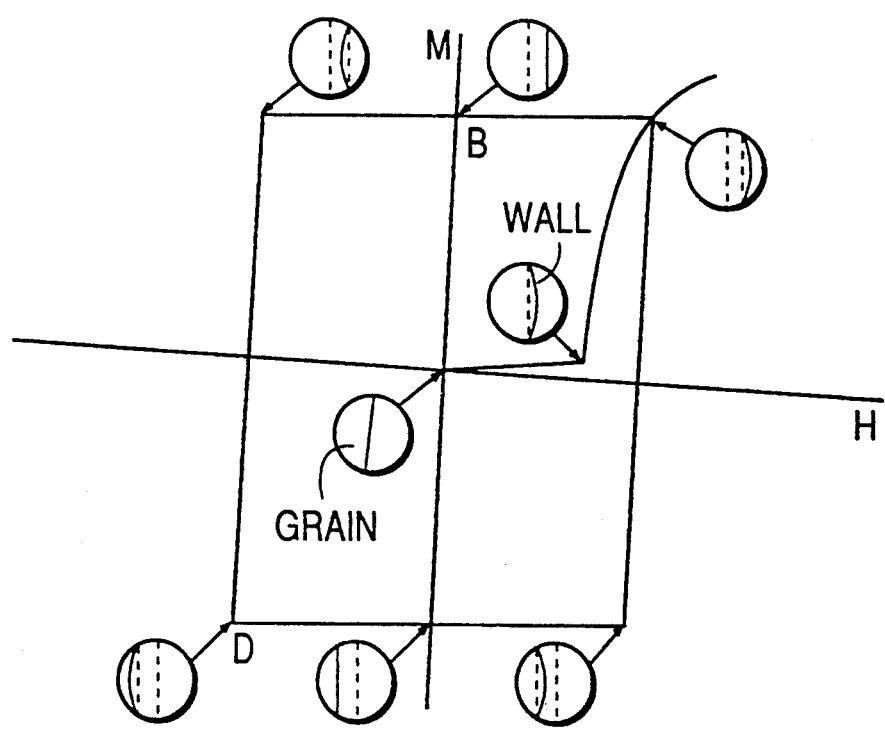
FIG. 3 is an illustration of the quantitative description of the ferromagnetic hysteresis loop according to the Globus simplified model.

By contrast to "average permeability" which represents an overall averaging of local reversible and irreversible permeability changes around the hysteresis loop, the "incremental permeability" focuses on the reversible contribution to the permeability at specific locations along the loops. The incremental permeability ($\mu_{inc}$) at any point on the loop is defined as the slope, $\Delta B/\Delta H$, of the major axis of the lenticular-shaped minor hysteresis loop which results by applying incremental changes in field, $\Delta H$, at the point of interest. This change in field can be achieved by applying very small AC currents, sufficiently small not to disturb the magnetic state of the ferromagnetic element in any irreversible manner, i.e., of small enough amplitude to maintain resulting magnetization excursions within reversible limits without altering the remanent magnetizations, at that point. It will be appreciated that the incremental permeabilities at points G and H in FIGS. 1a and 1b can be determined from the minor loops shown adjacent the major hysteresis loop. It can be seen that the slopes of the major axis of these minor loops $\Delta B_G/\Delta H$ and $\Delta B_H/\Delta H$, represent the incremental permeabilities $\mu_G$ and $\mu_H$ at points G and H. The reversible permeability, $\mu_{rev}$, at any point is the limit of $\mu_{inc}$ as $\Delta H$ approaches zero.

In accordance with the present invention the effect of stress on the magnetic characteristics of materials is examined by examining separately the effect of stress on substantially completely reversible or irreversible magnetic characteristics and not on averaged characteristics, such as average permeability whose values represent averages of reversible and irreversible processes, one of which increases and the other of which decreases with stress. In so doing, one gains a greater sensitivity to stress and focuses on characteristics which are less sensitive to ambient influences, such as temperature, magnetic fields, etc.

Figure 5:
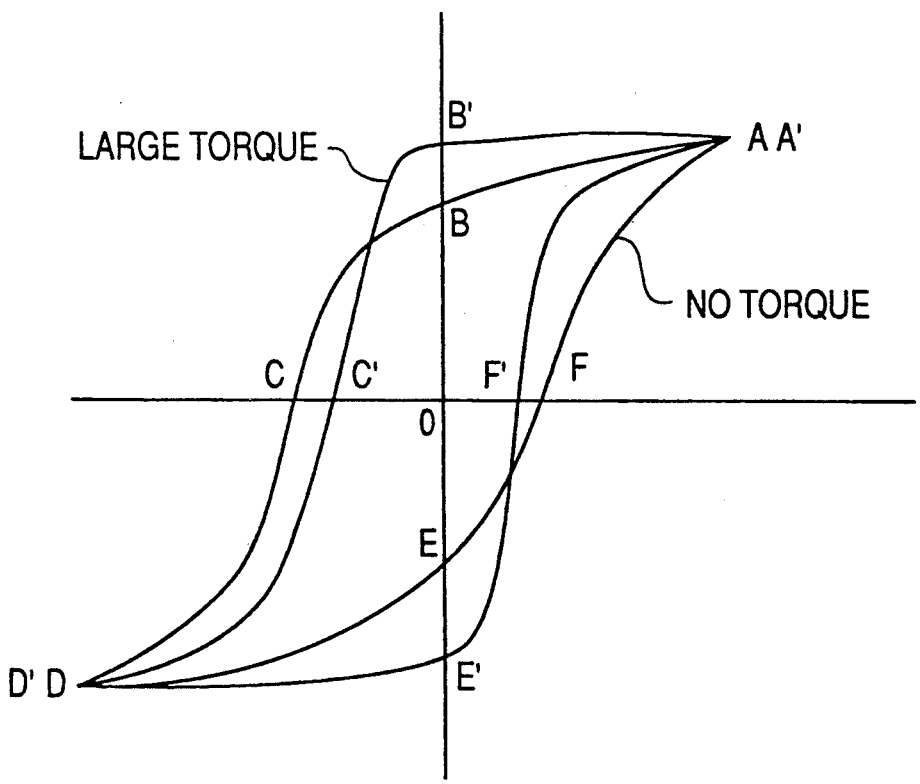
FIG. 5 is a graphical illustration of a major hysteresis loop as in FIG. 1 on the same axes with the corresponding major hysteresis loop for the same ferromagnetic material under torque.

One immediate benefit of the present invention's approach to stress sensing can be seen in a simple conceptual torque transducer comprising a horizontal shaft having a concentric coil wound thereabout and subjected to a clockwise torque. According to conventional average permeability rationale there will be virtually no change in the axial permeability of the shaft under torsion since the average permeability will increase in the +45° direction and decrease in the -45° direction. The net effect is that point A and point D in FIG. 5, barely move to points A' and D', respectively, when the shaft is placed under stress. Accordingly, average permeability, the slope of lines AOD or A'OD', remains substantially unchanged.

However, referring to the relocation of points B to B' and C to C', as a result of applied torsion, it is clear that notwithstanding the minimal change in average permeability, the applied torsion has, in fact, caused significant changes. The reversible permeability processes taking place along AB or A'B' have been reduced by the stress while the irreversible processes have been increased, as can be seen from the increased slope of the more vertical limbs and the reduction of $H_c$ (C to C' and F to F'). Thus, it becomes possible to measure torque by merely observing the inductance changes, caused by small conducted currents, of the coil whereas there is little change in the average inductance with large currents.

With this background, it is interesting to note how reversible permeability varies around the hysteresis loop. As an initial matter, the benefit of separating the changes in permeabilities due to the effects of stress on reversible and irreversible magnetization altering processes should be emphasized. By contrast, the average permeability, by its nature, effectively subtracts the reversible change from the irreversible change. This is because the two are in opposite directions and the irreversible change is generally much larger than the reversible change. Thus, the percentage change of either alone, i.e., the reversible or irreversible changes, will always be greater than the change in their average. Individually, or properly combined (as by adding their respective absolute values or by subtracting one from the other), the percentage changes in reversible or irreversible permeability due to stress will exceed the percentage change in average permeability.

Figure 6:
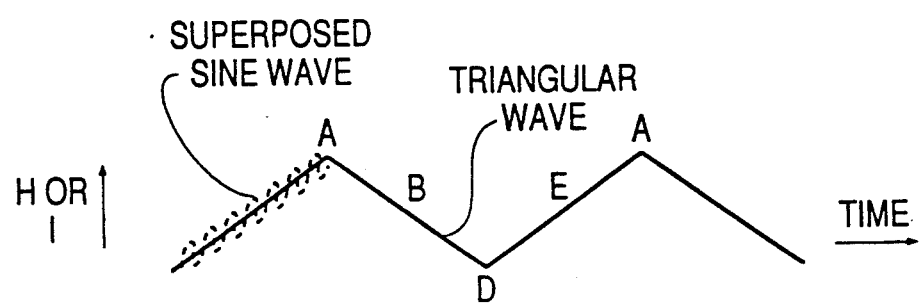
FIG. 6 is a graphical illustration plotting H or I versus time for a slowly varying triangular wave.

Reversible permeability as a function of applied field may be measured by superposing a small amplitude, generally sinusoidal alternating field on a more slowly varying (quasistatic d.c.), typically triangular, wave of the desired peak amplitude. The triangular wave carries the magnetization around the hysteresis loop at a constant dH/dt (except at the reversal points), as is shown in FIG. 6 which illustrates, since H is proportional to current, a wave of either H or I against time. If the actual value of H could be magnified, the higher frequency sine wave superposed on the triangular wave could be seen, as is shown in dotted lines in FIG. 6. Similarly, if the hysteresis loop were magnified, the lenticular shaped minor hysteresis loops illustrated in FIGS. 1a and 1b could be seen. The slope of the major axis ($\mu_{rev}$) of these minor loops changes as one traverses the complete major loop.

Figure 7:
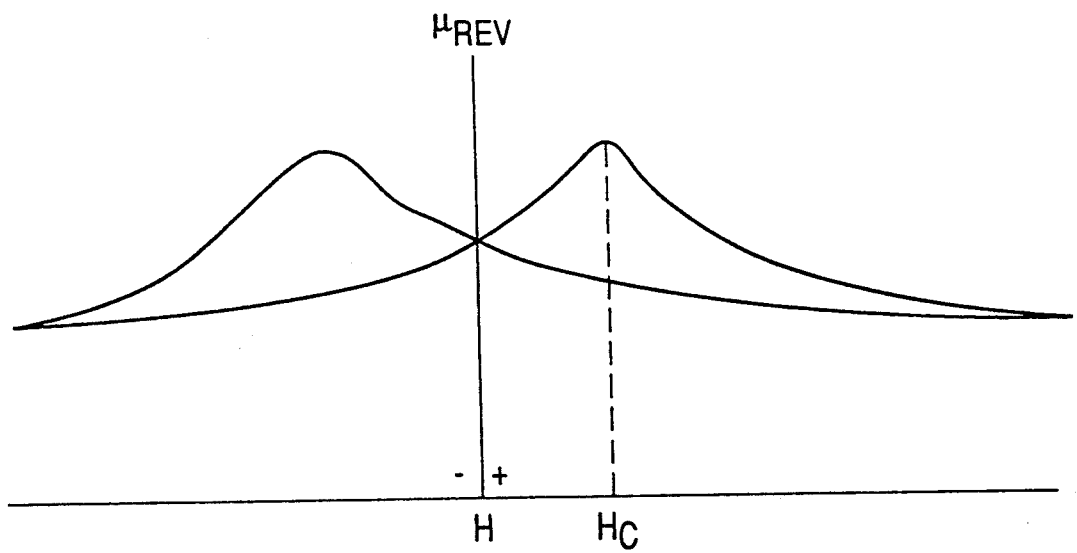
FIG. 7 is a graphical illustration plotting H versus $\mu_{rev}$.
Figure 30A:
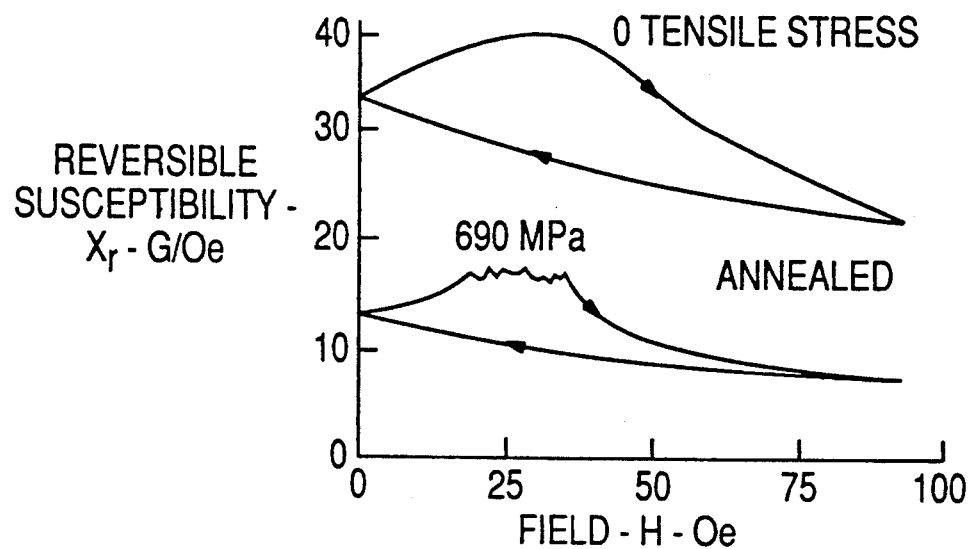
FIG. 30a is a graphical illustration of the effect of tensile stress on the reversible susceptibility of U-300 alloy following annealing.
Figure 30B:
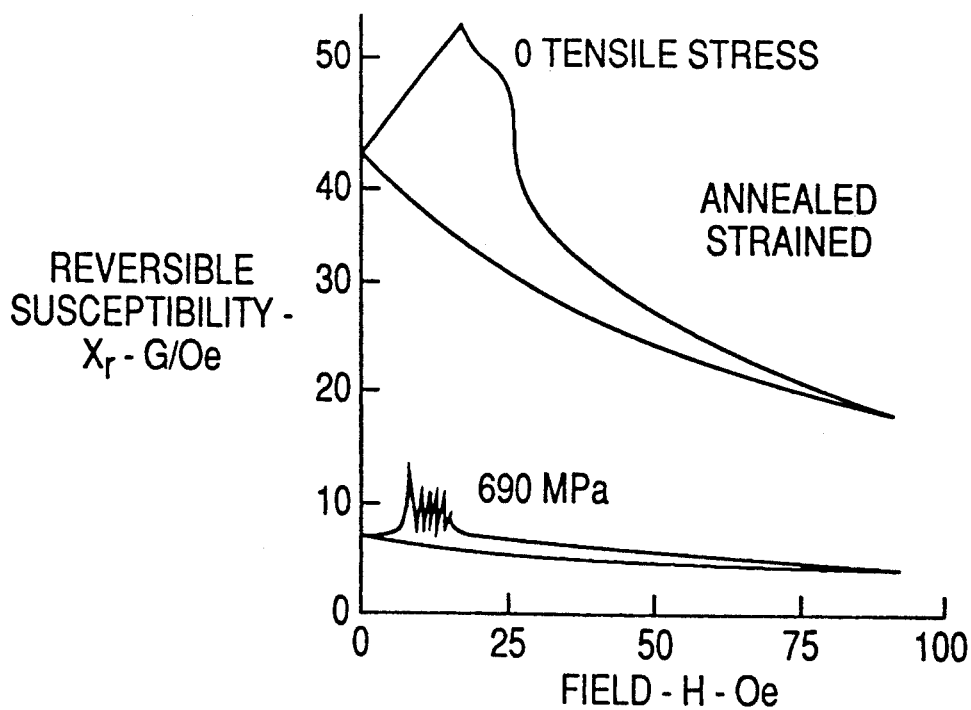
FIG. 30b is a graphical illustration of the effect of tensile stress on the reversible susceptibility of U-300 alloy following annealing and straining.
Figure 30C:
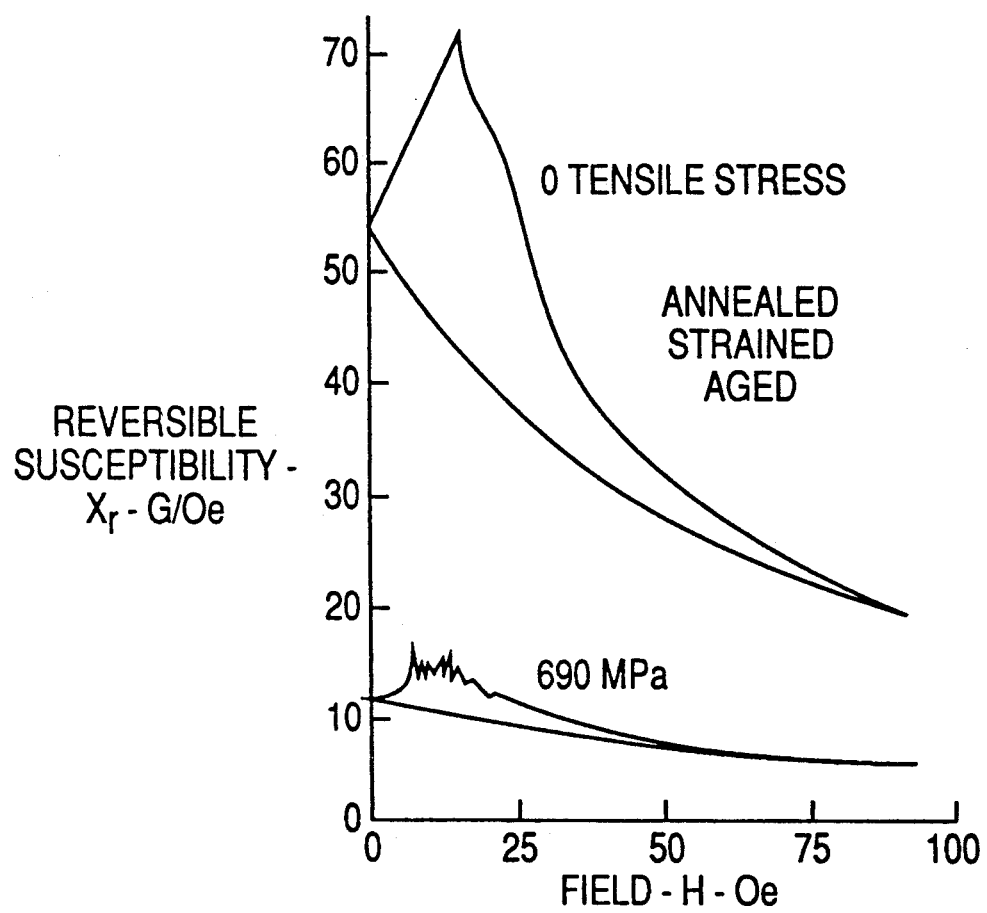
FIG. 30c is a graphical illustration of the effect of tensile stress on the reversible susceptibility of U-300 alloy following annealing, straining and aging.

A plot of these slopes ($\mu_{rev}$) against H is shown in FIG. 7. Loops of this type are commonly called "butterfly loops". It is noteworthy that they are symmetrical around H=O and, therefore, all of the essential information is contained in either half. Referring to FIGS. 30a-30c, it can be seen that the effect of tensile stress is to reduce significantly the reversible permeability, $\mu_{rev}$, in all fields. FIGS. 30a-30c actually illustrate reversible susceptibility, $x_r = dM/dH$, rather than permeability, $dB/dH$. The difference between permeability and susceptibility is numerically equal to 1 since $B = M + H$ and $dB/dH = dM/dH + dH/dH = dM/dH = 1$. It should be appreciated from FIGS. 30a-30c that the high stress (690 megapascals = 100,000 pounds per square inch) reduces the reversible permeability by relatively large amounts, larger even than could be achieved by fields as high as 90 Oersteds on an unstressed member. For purposes of comparison, and to appreciate how large a 90 Oersted field really is in a typical transducer the peak fields will rarely be this high, usually reaching only slightly larger than the "knee" in the B-H loop, perhaps twice the coercive force. By way of example, in a magnetoelastic torque transducer, a peak field reaches about 20 Oersteds.

A particularly convenient place to measure $\mu_{rev}$ is when H=O, i.e., at the remanence point, especially if one averages the coming and going values, $\mu_{rev1}$ and $\mu_{rev2}$ on a plot of H applied against $\mu_{rev}$. In small fields the slope of the "coming" and "going" lines are approximately equal but of opposite signs. The true $\mu_{rev}$ is then very close to the average of $\mu_{rev1} + \mu_{rev2}$. Measuring $\mu_{rev}$ at other than H=O has the very practical prob of assuring that the field is exactly what is desired and exactly constant from measurement to measurement, since the slope of $\mu_{rev}$ vs H is never zero and is field dependent.

Measuring $\mu_{rev}$ at the remanence points cannot easily be done, with accuracy, on an instantaneous basis since $H_{actual}=O$ does not occur at exactly the time when the exciting current crosses zero due to eddy currents both in the stressed member and in any conductive material exposed to the changing field. This phase shift can be ignored in some applications, especially in some commercial transducers that might be manufactured in quantities of identical units, wherein changes in some output voltage (not necessarily a pure indication of $\mu_{rev}$) is to be correlated with stress. However, since the stress would not be indicated in "real time" on a continuous basis but is in reality sampled at discrete times, a better and more practical method than instantaneous measurement of $\mu_{rev}$ is to pause when H=O and take the measurement.

Figure 8A:
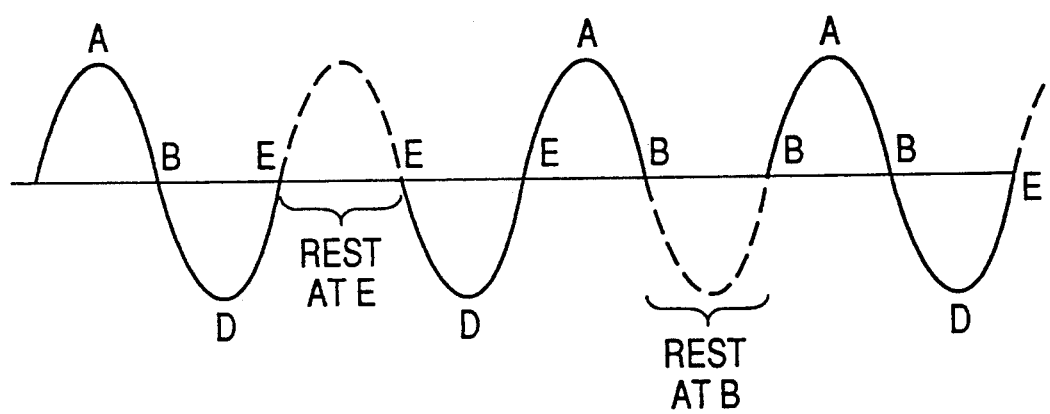
FIG. 8a is a graphical illustration of the wave for a large bipolar hysteresis erasing field, including rest periods therein.
Figure 8B:
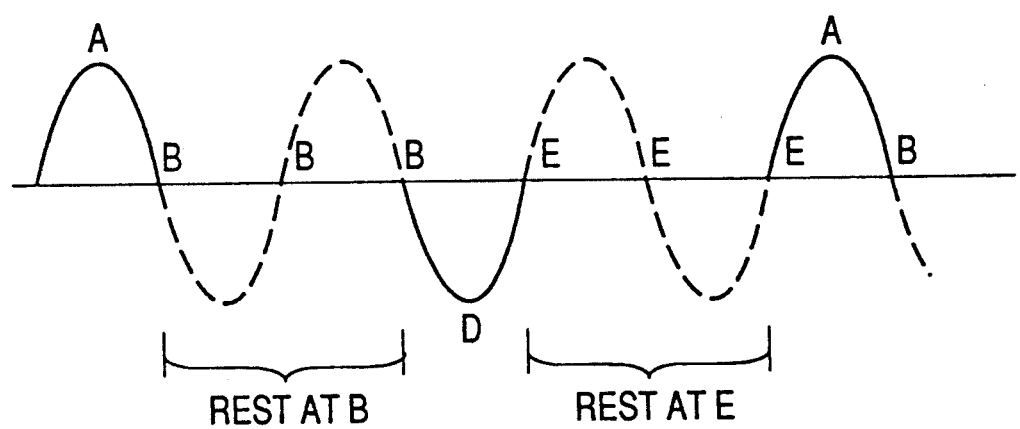
FIG. 8b is a graphical illustration of the wave for another large bipolar hysteresis erasing field, including rest periods therein.

In one embodiment of the present invention for sensing force related parameters by sensing changes in reversible (AC) permeability at remanent points, relatively large bipolar field excursions are employed to eliminate magnetoelastic hysteresis. Hereinafter this large bipolar field is referred to as the hysteresis erasing field. Such a field can be derived form a conventional magnetizing field of peak values A and D which follows a sinusoidal wave form by eliminating portions of the wave form in several ways. For example, as shown in FIG. 8a, periods of time one-half cycle long, separated by a full period, can be eliminated (rest periods shown in phantom) to establish a wave form which creates the remanent condition B or E in FIG. 1. As shown in FIG. 8b, full periods can be eliminated (rest periods, shown in phantom) separated by one-half period excursions of magnetizing field of alternating priority to create the remanent conditions B or E in FIG. 1 during the rest periods.

Figure 9A:
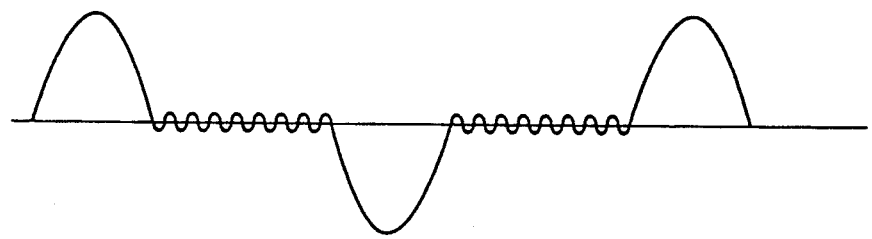
FIGS. 9a-9d are graphical illustrations of various wave forms resulting from superposing a low amplitude probing a.c. field onto the bipolar hysteresis erasing field of FIG. 8b.
Figure 9B:
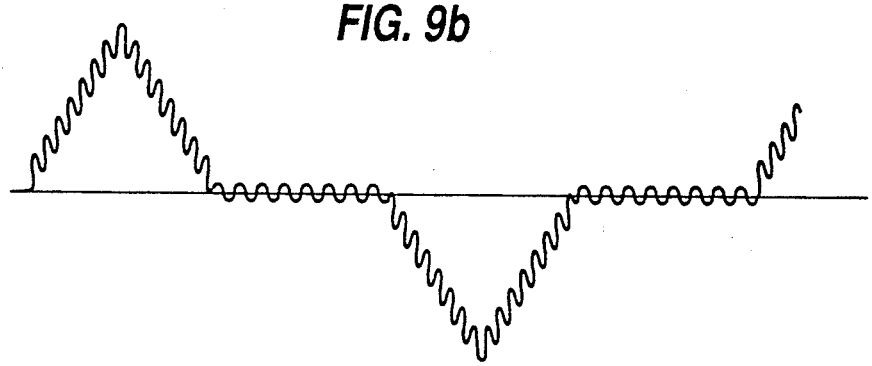
Figure 9C:
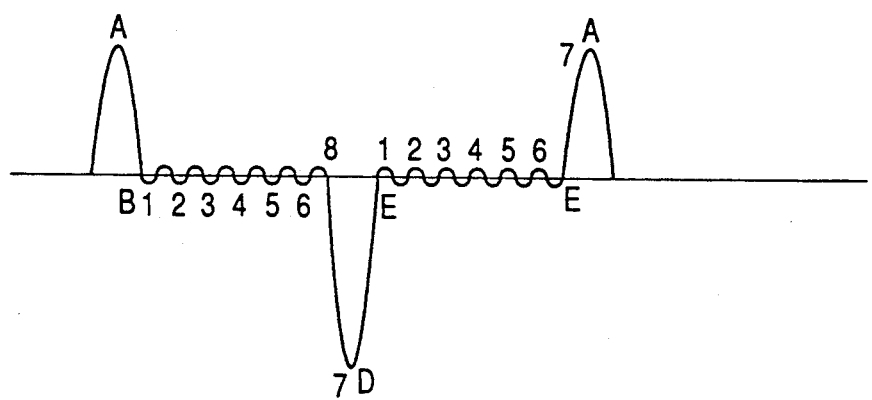
Figure 9D:
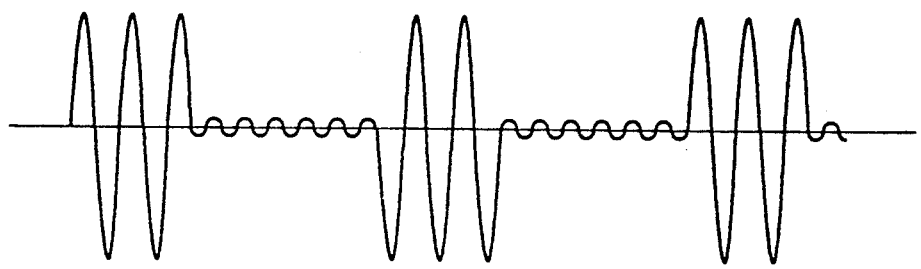

Obviously there are any number of combinations of magnetizing field excursions and rest periods that will provide the desired sequence of resting at alternate remanent polarities. During the rest periods the body is subjected to a low amplitude (low enough so as not to disturb the remanent magnetization) probing field of cyclically alternating polarity and measurement is made of the permeability to this field. The probing field will generally, but not necessarily, be of a substantially higher frequency than the erasing field. since the probing field is of low amplitude relative to the erasing field it can be superimposed on the erasing field without significant effect. The permeability measurement however is restricted to the rest period. Using the wave sequence in FIG. 8b as an example, a body may be subjected to intermittent or continuous probing field variations as is shown in FIGS. 9a and 9b. If the probing field and the erasing field are of the same frequency, the wave sequence may be as illustrated in FIG. 9C where every nth cycle the amplitude of the probing field is raised high enough to perform the erasing function. The wave sequence may be as illustrated in FIG. 9d wherein n also equals 7, as in FIG. 9c, and wherein there are bursts of erasing field cycles followed by probing field cycles. The idea is to periodically control the magnetization by a field that is strong enough to dominate the stress anisotropy and then allow the magnetization to "fall back" to a position determined only by the stress and the internal anisotropies of the body. During the probing period this equilibrium position is passively determined by measuring the reversible permeability. The erasing field need not be sinusoidal but should rise and fall more or less smoothly to allow the magnetization to follow. The measurement period is best delayed somewhat into the rest period in order to let eddy currents, from the rapidly changing erasing field, decay and the magnetization to stabilize.

Figure 10:
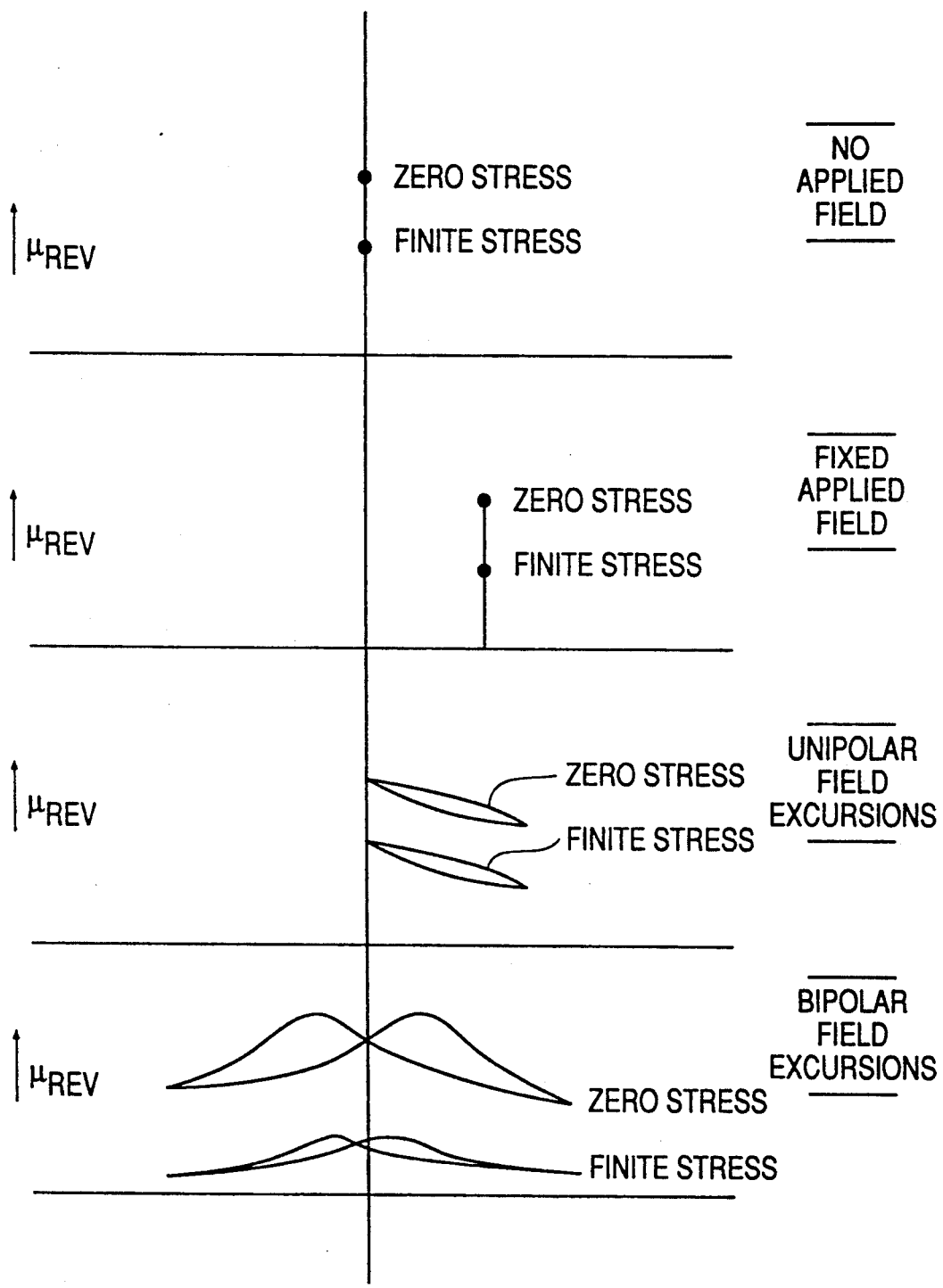
FIG. 10 is a series of graphical illustrations of H versus $\mu_{rev}$ for stressed and unstressed elements in no applied field, a fixed applied field, a unipolar field and a bipolar field.

The reason for using an erasing field of alternating polarity has to do with the nature of magnetoelastic hysteresis. Simply stated, the domain distribution variation with stress is not single valued since reorientation by stress itself takes place by reversible and irreversible processes. Thus, at any constant value of field, the magnetization and the reversible permeability will have different values depending on the previous history of the stress excursions. The amount of this magnetoelastic hysteresis—and its algebraic sign—are dependent on the material and the sources, directions and magnitudes of the internal anisotropies. Some combinations of these variables result in anhysteretic magnetoelastic (fully reversible) processes and this allows stress to be sensed by changes in the reversible permeability without ever magnetizing the body—effectively using the stress dependence of $\mu_o$ the initial permeability. Other combinations might have only modest amounts of magnetoelastic hysteresis and these might vary with field in such a way that a fixed field (e.g., from a permanent magnet) is adequate to reduce the stress vs $\mu_{rev}$ hysteresis to an acceptable level. A larger amount of such hysteresis could be reduced by only unipolar excursions of field. The reversible permeability that is measured could be at any specific value of such a field or averaged over any specific range. This variety of possibilities, ranging from no applied field, to a fixed applied field through unipolar and bipolar applied fields, is illustrated in FIG. 10.

In further explanation of the rationale for employing a hysteresis erasing field, it should be appreciated that following the removal of stress the distribution of domain orientations may not return to that existing prior to the application of the stress. To correct this situation the domain distribution is controlled with a strong field after which the stress regains control as the field is reduced to zero. This tends to erase the memory of whether the stress had been increasing or decreasing. If some such memory still exists the field is reversed and again control is temporarily taken away from the stress. For most complete elimination of hysteresis this reversal can be repeated several times by, for example, the "bursts" of erasing field illustrated in FIG. 9d.

Figure 11:
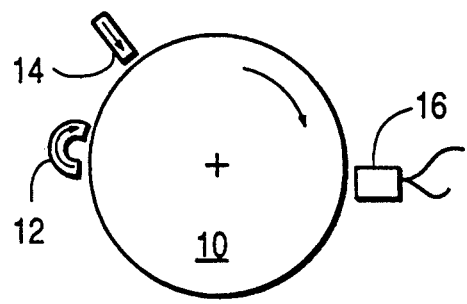
FIG. 11 is a schematic illustration of a sensor for measuring the torque in a rotating shaft.

If it is desired to measure torque in a shaft that is always rotating and it is not necessary to have a truly instantaneous response, an arrangement using one or more permanent magnets as shown in FIG. 11 has been found to be quite useful. Rotating shaft 10 has circumferentially spaced thereabout permanent magnets 12, 14 and reversible permeability sensing head 16, such as a coil. The angular separation between magnet 14 and sensor head 16 limits the ability of this configuration to sense instantaneous torque. For this reason the angle should be kept as small as possible, but not so small that magnet 16 affects the sensing ability of head 16. As any portion of the shaft surface approaches a magnet pole the domains in that shaft portion are aligned by the field of the magnet. As the shaft portion recedes from the magnet the magnetization "falls back" to an orientation controlled by the stress (torque). To the extent that the torque does not undergo large excursions between the time it leaves the last magnet and the time this same shaft portion is under the sensing head, the reversible permeability will be a true measure of that torque. As each point on the shaft surface approaches, passes by and recedes from a magnet pole, it undergoes a cycle of unipolar magnetization just as a stationary shaft would if the field of an electromagnet went through a unipolar excursion as shown in FIG. 10. If there are several magnets with opposite poles facing the shaft the shaft surface would undergo bipolar excursions similar to those shown in FIG. 10. U-shaped magnets would provide such an excursion and could be oriented either circumferentially or axially.

Figure 12:
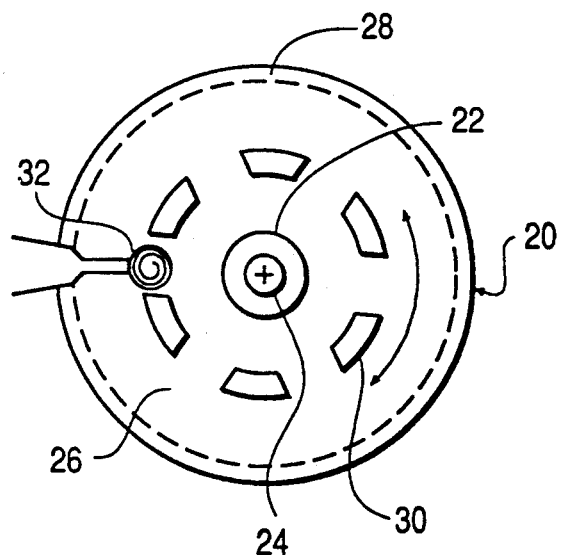
FIG. 12 is a schematic illustration of a sensor for measuring the torque in a gear, pulley or sprocket.

The present invention is not limited to sensing torque on a rotating shaft but could also be used to sense tension in a moving wire, either along some straight path or as it goes around a non-magnetic pulley. Such a sensor might have use in endless belts for transmitting power when the belt is reinforced with steel tension wires. The sensor could also be used for sensing the torque in a gear or pulley or sprocket or the like, or in a coupling transmitting torque from one shaft to another. An arrangement suitable for this purpose is illustrated schematically in FIG. 12 wherein a gear, sprocket or pully 20, rotatable in either direction, is mounted via hub 22 onto shaft 24. A web 26 is defined between hub 22 and rim 28, which rim may comprise gear or sprocket teeth, pulley grooves, or the like. Mounted in circumferentially spaced apart relationship around web 26 are a plurality of magnets 30. A sensor head 32 is also mounted proximate to web 26 and may be of any of the well known types. For example, the sensor head 32 may comprise pancake type coils arranged to fit reasonably close to the surface of the stressed member, as by being bent to wrap around shaft 24. It is important to recall that, consistent with the present invention, the exciting current for sensor head 32 must be small enough to avoid irreversible excursions of the magnetization.

Figure 13:
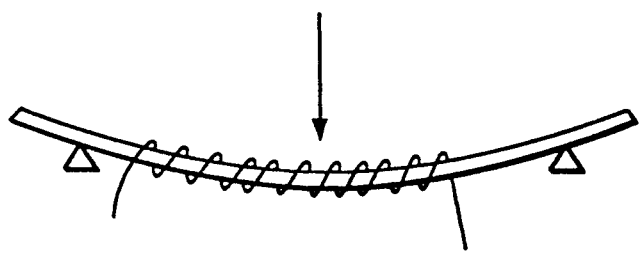
FIG. 13 illustrates a beam under stress supported at its ends and having a solenoidal winding thereabout.
Figure 14A:
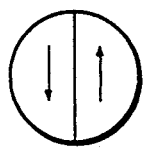
FIGS. 14a-14p illustrate the unstressed and stressed grain domain wall orientations in the beam illustrated in FIG. 13.
Figure 14B:
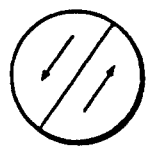
Figure 14C:
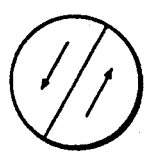
Figure 14D:
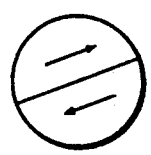
Figure 14E:
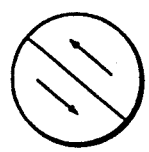
Figure 14F:
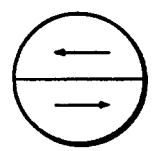
Figure 14G:
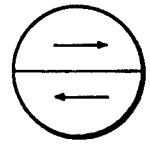
Figure 14H:
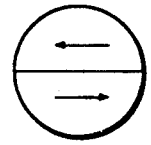
Figure 14I:
Figure 14J:
Figure 14K:
Figure 14L:
Figure 14M:
Figure 14N:
Figure 14O:
Figure 14P:

Still another illustrative example of sensing force related parameters does not involve a stressed member that is movable relative to the sensing and magnetizing means. For example, in a load sensing arrangement for sensing the pressure on a diaphragm or bellows or the load applied perpendicularly to a beam, the sensing element may be in the form of a simple beam, as illustrated in FIG. 13, supported at each end and including a concentric solenoidal winding thereabout. As is well known, under the force loading shown, the portions of the beam above the neutral axis (the plane of the geometric center if the beam is of a symmetrical cross section—e.g., circular, square, rectangular, I-shaped, etc.) are under compression while those below the neutral axis experience a tensile stress. If the average permeability is measured, as by the inductance of the solenoidal winding, little change in average permeability will be noted since the contributions of the stressed portions above and below the neutral axis will change in opposite directions. However if the reversible permeability is measured in an initially unmagnetized beam, the reversible permeability will be found to decrease, i.e., the inductance with very small a.c. field excursions, at low currents, will go down. Of particular note is that this will be the result whether the material has a positive or a negative magnetostriction.

This unexpected and unpredictable result can be explained by considering the portions of the beam below the neutral axis. These are in tension. If the beam material has a positive magnetostriction the domain magnetizations will be reoriented toward the tension direction, i.e., along the beam. This means, with reference to FIG. 14, that under moderate bending loads, a grain in which the magnetization is initially oriented as in (a) will change to the orientation shown in (b). A grain initially oriented as in (c) will change to (d). Likewise, a grain oriented as in (e) will change to (f). However, grains oriented as in (g) and (h) will remain unchanged. The result is that in a small a.c. field in the longitudinal direction the (a), (c) and (e) oriented grains will experience an increase in permeability due to the improved effectiveness of the field. The effective field is $H \cos \Theta$ where $\Theta$ is the angle between the field direction and the magnetization. In (a), (c) and (e), $\Theta$ starts out nearer to 90°, where $\cos \Theta$ is zero. Therefore, any reduction in $\Theta$, as in (b), (d) and (f) makes the field more effective. No such effect will occur for (g) and (h).

On the compression side of the beam, a grain whose magnetization is initially oriented as in (i), (k) and (m) will change to (j), (l) and (n), respectively, whereas orientations (o) and (p) will remain unchanged. Thus, the cos Θ effect is a wash between the tension and compression portions of the beam and there is no discernible change in average permeability.

On the other hand, all domain walls will be stiffened by the addition of the stress anisotropy to the existing internal anisotropies with the result that the walls will bow less under the influence of the exciting field. Since the magnetization change is the result of change in the volumes of oppositely directed domains, this reduced bowing means less magnetization change and since permeability is by definition $\Delta(M+H)/\Delta H$, the bending stress will act to diminish it. With a material having negative magnetostriction the events on the tension side and compression side will be reversed but they will sum to the same result. Experiments with a nickel wire ($\lambda_s = -35 \times 10^{-6}$) and with a T-250 Ni maraging steel wire ($\lambda_s = +32 \times 10^6$) have verified that both materials show a decrease in coil inductance with increasing bending stress.

Figure 15:
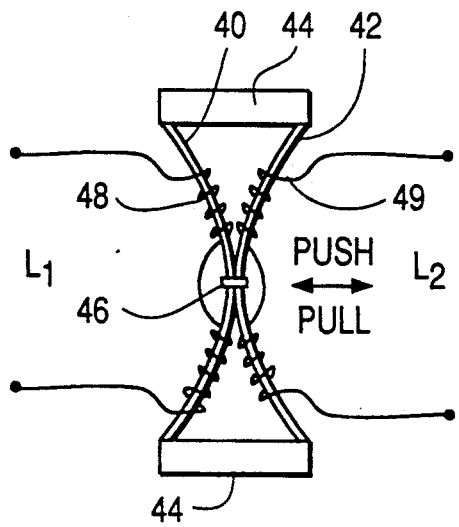
FIG. 15 illustrates an exemplary force transducer in accordance with the present invention.
Figure 16:
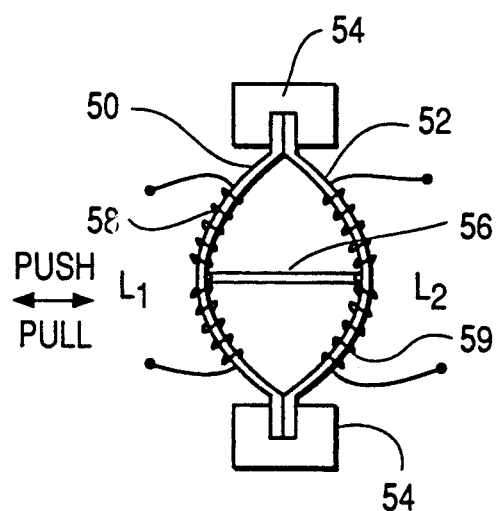
FIG. 16 illustrates another exemplary force transducer in accordance with the present invention.
Figure 17:
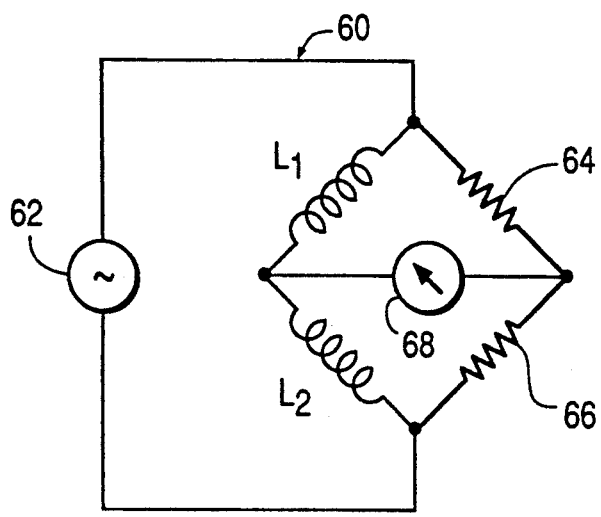
FIG. 17 illustrates exemplary sensing circuitry useful in connection with the force transducers of FIGS. 15 and 16.

FIGS. 15 and 16 illustrate simple arrangements utilizing this effect for force transducers constructed and operated in accordance with the present invention. They illustrate two straight beams 40, 42 in FIG. 15 and 50, 52 in FIG. 16, respectively, which have been bent as shown, within their elastic limits, and are maintained in their respective bent conditions by mounting their ends in frame members 44, 54. In the FIG. 15 embodiment beams 40, 42 are held together at their center by nut, screw or weld 46. In the FIG. 16 embodiment, tie bar 56 maintains beams 50, 52 bowed apart at their center. Beams 40, 50 include solenoidal windings 48, 58 thereabout (the inductance of which is designated $L_1$). Beams 42, 52 also include solenoidal windings 49, 59 thereabout (the inductance of which is designated $L_2$). A push or a pull applied to either beam system will increase the bending in one beam and decreases the bending in the other, increasing the inductance in the one in which the bending stress is decreased and decreasing the inductance of the beam in which the bending is increased. The circuit illustrated in FIG. 17 is exemplary of the type of phase sensitive detectors, multivibrators or the like which will give directional, i.e., positive and negative, outputs. The circuit 60 includes a low amplitude a.c. signal source 62 and fixed impedances 64, 66 in a bridge circuit with impedances $L_1$ and $L_2$. Meter 68 may be calibrated to read directly in units of applied force or displacement distance from a center position, or the like. The use of two elements in the system provides common mode rejection to account for variation in the temperature, ambient fields, etc.

Referring back to FIG. 4, it will be appreciated that the fall back of the magnetization from its peak value as the exciting field returns to zero (from its peak amplitude) is completely controlled by the effective anisotropy acting on the body. This should be obvious since the applied field during its waning phase can do no more than whatever it has already done at its peak strength. This limb of a hysteresis loop, AB or A'B', therefore reflects mostly the relaxation of reversible actions of the field, i.e., straightening of bowed domain walls and reversible rotation of the domain vectors to the orientation at which the local anisotropies are in equilibrium. This being the case, the fall back to remanence, B, B', should be strongly influenced by any additional anisotropy caused by an applied stress. Indeed, if the stress were purely uniaxial and the stress anisotropy was considerably larger than all of the internal anisotropies existing before the stress was applied, then the slope of the fall back, A'B', from $H_{peak}$ would approach zero. In other words, the values of $M_{A'}$ and $M_{B'}$ would approach each other and it could be said that $$M_{A'} - M_{B'} \rightarrow 0,$$

or that the remanence ratio, $$M_{B'}/M_{A'} \rightarrow 1.$$

The average permeability, i.e., the slope of the line AO for the unstressed condition or A'O for the stressed condition, is a poor indicator of the effect of stress. This is because average permeability is highly dependent upon $H_{peak}$. As shown in dotted lines in FIG. 4, if $H_{peak}$ were large enough, A and A' would coincide, lines AO and A'O would coincide, and there would be no increase in average permeability detectable notwithstanding the application of axial tension to induce stress. However, unlike the average permeability, the slope of the fall back from peak to remanence is little affected by the magnitude of $H_{peak}$. Changes in the fall back slope are dominated by applied stresses. This limb, AB or A'B' of the hysteresis loop is saturated with information relating to the magnitude of forces applied to the body. Therefore, in accordance with the present invention the slope of AB or A'B', which is controlled entirely by anisotropies, has been determined to be an excellent and reliable measure of the stresses arising in a body due to externally applied forces. Likewise, measurement of the remanence ratio or of the difference in magnetization between the tip of the loop and the remanent point are all viable ways to measure the force applied to a body. If $H_{peak}$ is fairly well controlled then the remanence itself (B or B') or the change in magnetization between remanence points, i.e., $M = B - (-E)$ or $B' - (-E')$ becomes, due to its simplicity, a very attractive measure of the applied force.

Figure 18:
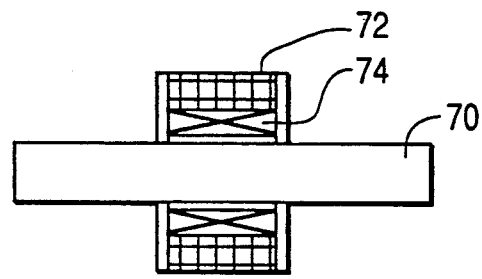
FIG. 18 is a schematic illustration of a stressed element concentrically encircled by exciting and sensing coils.
Figure 19:
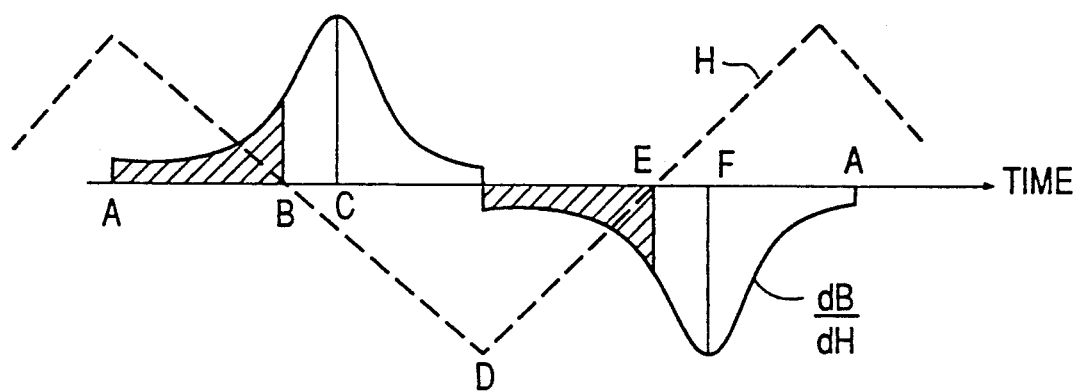
FIG. 19 is a graphical illustration of secondary voltage (or differential permeability) against time for a body that is not under stress.

There are numerous possible measurement methods and configurations for sensing these remanence-related parameters. For example, referring to FIG. 18 which illustrates a stressed element 70 surrounded by concentric exciting and sensing windings, 72, 74, respectively, it can be seen that this configuration is effectively a transformer with stressed element 70 as the core. For purposes of simplicity, it shall be assumed that the exciting winding 72 (primary) is excited with a triangular wave alternating current. The triangular wave has a constant value of rate of change of current and, therefore, of H. In other words, dH/dt is a constant. The voltages appearing across the sensing winding 74 (secondary) are the instantaneous slopes of the B vs. H hysteresis loop, i.e., the differential permeability. This is because the induced voltage is a function of the number of turns and the rate of change of flux and the latter is a function of the cross-sectional area and the rate of change of flux density (B). Since dH/dt is a constant, a plot of the differential permeability or corresponding voltages on a uniform time basis can be made for the FIG. 4 conditions, i.e., stressed and unstressed. FIG. 19 is such a plot with the body under no applied stress whereas FIG. 20 shows such a plot with the body under axial tension.

Figure 20:
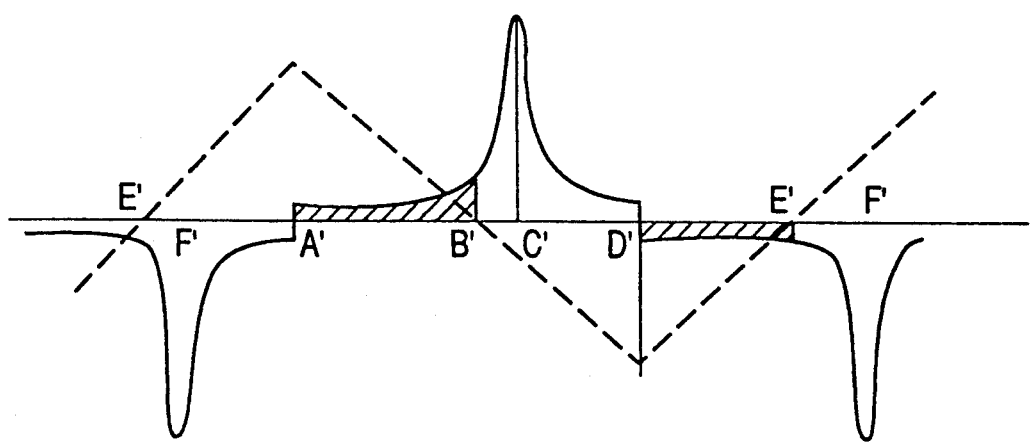
FIG. 20 is a graphical illustration of secondary voltage (or differential permeability) against time for a body that is under axial tension.
Figure 21:
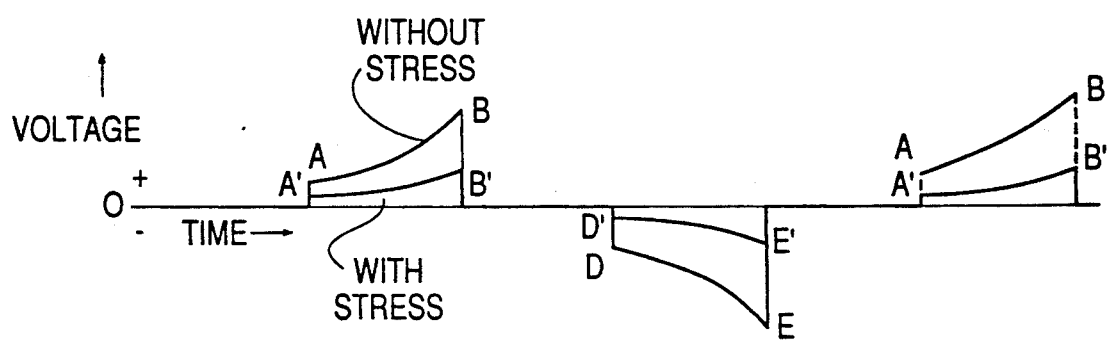
FIG. 21 is a graphical illustration of secondary voltage (or differential permeability) against time for the remanent fall back period of interest for both a body under stress and a body not under stress.

The region of interest is the remanent fall back region which is between the respective peaks and the zero crossing of the excitation current or applied field shown superposed in dashed lines in FIGS. 19 and 20. If a switch is connected from the sensing winding to a voltmeter (an ac-rms or rectifying type of meter) which closes during the period of interest and is open otherwise, a voltage wave is produced as shown in FIG. 21 which graphically and comparatively illustrates on a single plot the corresponding secondary voltage (or differential permeability) with and without stress. It is clear from FIG. 21 that the voltage signal is zero during periods DB and EA when the switch is open and decreases with increasing stress during periods AB and DE when the switch is closed. This voltage signal can be calibrated, in known fashion, to proportionally indicate the extent of the applied force.

While the foregoing discussion has postulated the use of triangular wave excitation it is equally valid for other wave shapes as well, including sine wave. Only the shapes of the voltage signal, corresponding to FIGS. 19, 20, 21, will be altered. The effect of increasing tensile stress will be, in all cases, to reduce the signal voltage.

Practical devices may be constructed utilizing two sensing windings, one over a stressed region and one over an unstressed region. Alternatively a device might be constructed in such a way that both regions have a quiescent stress which is increased in one region and decreased in the other region by the applied force. Such constructions aid in common mode rejection of changes in signal due to temperature variations and the like. In fact, very little adjustment for temperature is necessary since temperature has a similar effect on $M_s$ (the saturation magnetization), K (the internal anisotropies) and $\lambda_s$ (the saturation magnetostriction). Increasing temperature generally causes decreases in all of these parameters. When devices are constructed in this manner, the output signal will be the difference between two voltages, and this difference will rise from zero with increasing stress.

Figure 22:
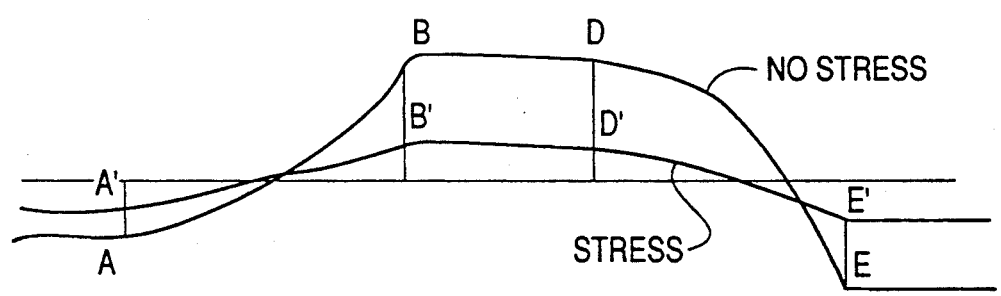
FIG. 22 is a graphical illustration of the time integral of voltage against time for the remanent fall back period of interest for both a body under stress and a body not under stress.

Instead of measuring the voltages shown in FIG. 21, it is alternatively possible to measure their integrated values. The voltages shown in FIG. 21 are due to the rate of change of flux and are, therefore, wave shape and frequency dependent. If these voltages are integrated, the result is a wave such as is illustrated in FIG. 22. The flat portions coincide with the zero voltage portions of the waves shown in FIG. 21, i.e., those portions of the hysteresis loop that are not measured. The amplitude of these flat portions is proportional to the magnetization change from the peak points to the remanent points and, therefore, is independent of the frequency and wave shape of the exciting current (except to the extent that these parameters affect the flux penetration and, therefore, the effective area, A). The important point is that they are flat for substantial periods and, therefore, easy to measure with simple peak detector circuits or "sample and hold" circuits, both well known to those skilled in the electronics art.

Figure 23:
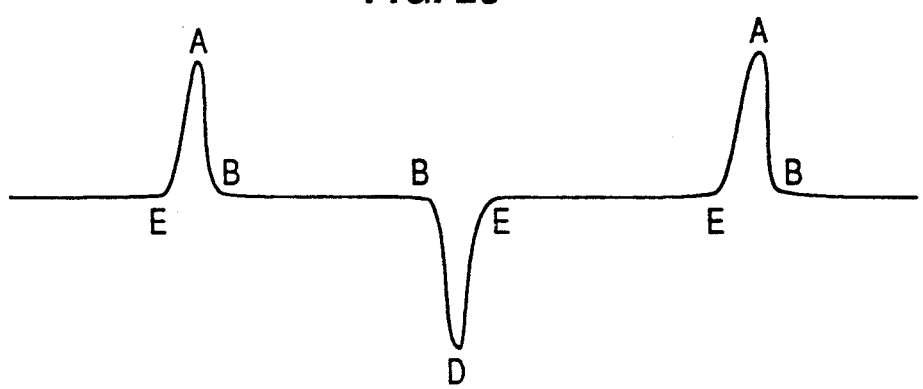
FIG. 23 is an illustration of the wave form for an excitation current in the form of smoothly rising and falling pulses of alternating polarity.

The very strong and definite sensitivity of the remanence to stress, compared, for example, with the peak magnetization which may or may not change very much—depending on the material, peak field and mode of stressing—allows its measurement by quite simple means. Consider, for example, the transformer arrangement of FIG. 18 with an excitation current in the form of smoothly rising and falling pulses of alternating polarity, as shown in FIG. 23. The magnetization is carried around the major hysteresis loop of FIG. 4 as indicated by the sequence of letters. Ignoring the actual voltages induced in the secondary (sensing) winding and looking only at their time integral, $\delta$Vdt obtainable from a simple circuit 80, such as is shown in FIG. 24, yields curves showing the variation in flux density in core 70 with time. Circuit 80 comprises stressed core 70 surrounded by excitation (primary) and sensing (secondary) windings 72, 74 and includes an operational amplifier 82 arranged in relationship with resistive element 84 and capacitive element 86 to form an integrating circuit such that $V_{out} = 1/RC\delta Vdt$.

The curves shown in FIG. 25 show the variation in flux density in the stressed core with time. If the pulses are of short duration relative to the interpulse period, they contribute little to the average value of the rectified waves. The height of the pulse in FIG. 25 is the maximum flux density A, A' or D, D' while the magnitude of the flat portions is the remanent flux density. A may or may not rise to A' with stress but B will certainly rise to B' (when considering a material with positive magnetostriction and under tensile stress).

From this integrated output we can measure $M_A$ (with a peak detector), $M_B$ (either as an average or by sampling at some convenient time in the interpulse period), their difference in a differential amplifier 90 or their ratio in a divider circuit 92, as shown schematically in FIG. 26. Where appropriate and desired, differential arrangements can be advantageously applied to obtain common mode rejection if required for additional insensitivity to temperature.

The clear and definite stress information-containing signals obtained from this remanence method and the reversible permeability method greatly relax the need for efficient magnetic structures such as yokes and other flux closing members. As long as the complete sensor is not subjected to a variable intrusion of strongly conductive or permeable materials which might link substantial percentages of the leakage flux around the coils or core members, reliable and consistent operation can be obtained. Any box-like enclosure can provide protection against such intrusion. Such enclosures would normally be used as a matter of commercial practice.

Still another sensing and measuring technique useful with the sensor and method of the present invention involves sensing of changes in the d.c. permeability of the stressed member in a unipolar, substantially constant, applied field to obtain a measure of the external force applied thereto. This method effectively separates the mostly irreversible actions of a magnetic field, i.e., polarization by domain wall motion, from the mostly reversible actions of stress, i.e., alteration of the orientation of the easy axis within each domain. For example, if a member is subjected to the field from a permanent magnet positioned along one side of the member and a field intensity detector is positioned along the opposite side of the member such that the member is placed between the magnet and the detector, the detector will sense the leakage flux, i.e., the flux not conducted through the member. For a member fabricated from a material having a positive magnetostriction and subjected to a tensile force parallel to the flux path through the member, the easy axis of each domain, not previously so oriented, will be reoriented to be more closely aligned with the tensile force and hence the flux path, thereby facilitating the conduction of the magnet flux along this path through the member. This will result in more of the magnet flux being conducted through the member with a concomitant decrease in the leakage flux. Compressive forces will have the opposite result. Since the cross-sectional area of the member is essentially unvaried by the stress, and there are only relatively minor changes in the field supplied by the permanent magnet, these changes in flux through the member effectively reflect changes in the d.c. permeability of the member. The difference in detected flux when the member is in a stressed condition compared to when it is in an unstressed condition, or when it is in a different stressed condition, creates an output which is proportional to the differences in the applied forces creating the two conditions.

A similar sensing technique, using a member simultaneously subjected to an applied force and the polarizing influence of the field from a permanent magnet, in which changes in the d.c. permeability of the member due to the stresses associated with the applied force result in changes in the leakage flux portion of the total flux from the magnet, positions the field intensity detector on the same side of the member as the permanent magnet in such a manner as to detect only the leakage flux and not the flux conducted through the member.

Figure 33A:
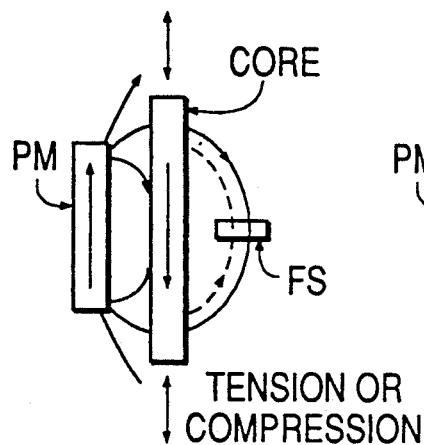
FIG. 33a is a schematic representation of one form of a force transducer in accordance with the present invention.
Figure 33B:
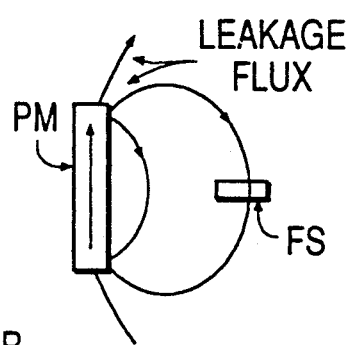
FIG. 33b is a schematic representation of a magnetic circuit consisting of a permanent magnet (PM) and a field sensor (FS).
Figure 33C:
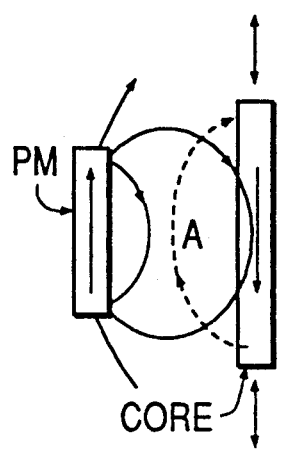
FIG. 33c is a schematic representation of another form of a force transducer in accordance with the present invention.

A force transducer adapted to accomplish the aforementioned sensing and measuring techniques consists of a ferromagnetic load bearing member which serves as the stressed core (CORE), a permanent magnet (PM) to provide the polarizing field and a field sensor (FS). Physical arrangements of these three elements, to enable their cooperative functioning as a transducer, are schematically illustrated in FIGS. 33a and 33c. The elements are fixed in the relative positions shown and will, in practice, be positioned as close to one another as the application allows. In many applications they will be in intimate physical contact. Non-contact applications involving, e.g., a core which is rotating or one that requires environmental isolation, will sometimes favor the arrangements indicated in FIG. 33c. Besides the obvious result of minimizing the overall size of the transducer, this close physical packing of the elements provides maximum sensitivity to the stress induced field changes relative to possible "stray" fields. The field sensor will typically be a Hall effect or magnetoresistive device but may be any device having an electrical output proportional to magnetic field intensity. It is located, relative to the core and the PM, where there are maximum changes in field intensity and it is oriented to have a maximum response to the field vector at its location.

The structure and operation of the force transducers of FIGS. 33a and 33c are best understood by considering the operation of the magnetic circuit prior to examining the effects of stressing the core. In the absence of the core (FIG. 33b), the field intensity depends only on the strength of the PM and the sensor location. With the core placed in the field of the magnet, it develops a bulk magnetic moment of its own by virtue of its polarization. This moment, in the same direction as the field of the PM, is the source of an additional magnetic field in the space around the core. If the core is positioned between the sensor and the magnet, as shown in FIG. 33a, its field is directed oppositely to that of the PM (dashed vs solid flux line) resulting in a decrease in the net field at the sensor. Stated otherwise, the field sensor sees the PM flux less the flux associated with the bulk magnetic moment of the core. The result will be similar if the sensor is located as in the FIG. 33c embodiment on the same side of the core as the PM and positioned, as at A, to detect only the leakage flux and not the flux conducted through the core.

The polarization of the core has an additional effect on the field at the sensor other than that due to the additive or subtractive field of its own bulk moment. The presence of the core also affects the very source of its own polarization, i.e., the field of the PM. This effect can be understood by reference to FIG. 34. The PM in FIG. 33b operates into an open circuit with no definite air gap. All of its flux is leakage flux and all of the magnetic circuit permeance is leakage permeance ($P_L$). $P_L$ is determined from effective demagnetizing factor of the magnet which depends chiefly on its geometry. From the magnetic circuit analogy to Ohm's Law $B_m A_m = H_m l_m P$ where $A_m$ is the cross sectional area and $l_m$ is the length of the PM. The conditions of the magnet, i.e., $B_m$ and $H_m$, are found at the intersection of a line of slope P with the demagnetizing curve of the PM material. In the open circuit condition, for which $P=P_L$, this is found as point "a" in FIG. 34.

The introduction of the core into the magnetic circuit provides a higher permeance path for some of the PM's flux since its permeability ($\mu_{core}$) exceeds that of air. The operating point of the magnet will thus be shifted by the presence of the core to point "b", found at the intersection of the line of steeper slope $P_T$, representing the increased total permeance, and the minor loop of the PM (it is common to show this narrow loop as a line of slope $\mu_r$, the recoil permeability). Cores having higher permeabilities or larger cross-sectional areas will cause a greater increase in $P_T$, thus shifting the operating point even further to the right, e.g., to point "c".

The effect of the core on the field at the sensor is seen to be the combined effect of its own moment and its effect on the moment of the PM. Its moment increases with tensile stress and decreases with compressive stress. The moment of the magnet (it is adequate for this analysis to consider that the moment of the magnet is measured by $B_m$) was seen from FIG. 34 to increase with increasing core permeability. Since $\mu_{core} = B/H = (4\pi M + H)/H$ where M is the core magnetization (proportional to its bulk moment), tensile stress will increase, and compressive stress will decrease $\mu_{core}$. Thus stress in the core will have the same qualitative effects on the moment of the PM as on its own moment. Depending on the location of the sensor relative to the core and PM, this stress dependence of both moments can have reinforcing or opposing effects on the sensed field. In either case, the direction of the stress induced change in the net field, i.e., its increase or decrease, is always the same as the direction of change in the agent of change, namely, the core moment. These and other details regarding the operation of the device can be better understood by examining the actual performance of experimental force transducers.

A variety of experimental transducers were constructed to examine the range of factors influencing performance. Most of the measurements reported here were obtained with devices configured specifically for uniaxial tensile and compressive loading. The uniformity of stress over the cross-section under such loading simplifies the interpretation of the data. Tubular cores were utilized for most of the axial load tests, both as a matter of experimental convenience and the apparentness of utility for commercial applications. While a variety of core materials were actually tested, and others contemplated, the major experimental focus was on 18% Ni maraging steels (18.5 Ni, 9.0 Co, 4.8 Mo, 0.6 Ti, 0.1 Al, 0.03 max C, Bal Fe; Annealed 815° C. 1 hr in H₂). These materials have the unusual combination of high mechanical strength together with a high stress sensitivity of all of its low field magnetic properties.

Figure 35:
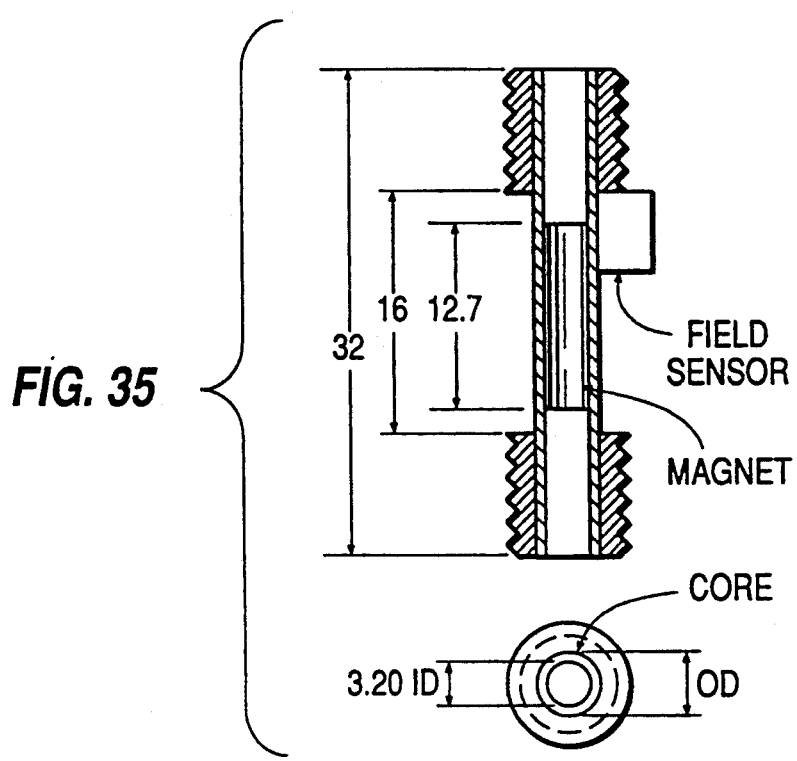
FIG. 35 illustrates an experimental force transducer constructed in accordance with the present invention.

The dimensions and constructional details of an experimental transducer having a tubular core and a constant ID but with differing wall thickness in accordance with the following chart is shown in FIG. 35:

| SAMPLE | OD mm | AREA mm² |
|--------|-------|----------|
| A | 3.683 | 2.609 |
| B | 3.797 | 3.281 |
| C | 3.924 | 4.051 |
| D | 4.445 | 7.473 |

The cores were machined from 6.35 mm diameter solid rods. The holes were drilled and reamed and the OD's were turned and ground prior to heat treatment. Stainless steel threaded end pieces were provided for secure gripping during tensile loading without distorting the tube ends. Loading was limited to 1000N to avoid failure of the epoxy joints at the end pieces. A Texas Instruments, Inc. type TL3103C, linear, integrated circuit, Hall effect sensor, having a measured output of 1.54 mV/Oe, was clamped to the core. The magnet was a sintered Alnico 8 having a 3.17 mm diameter.

Figure 36:
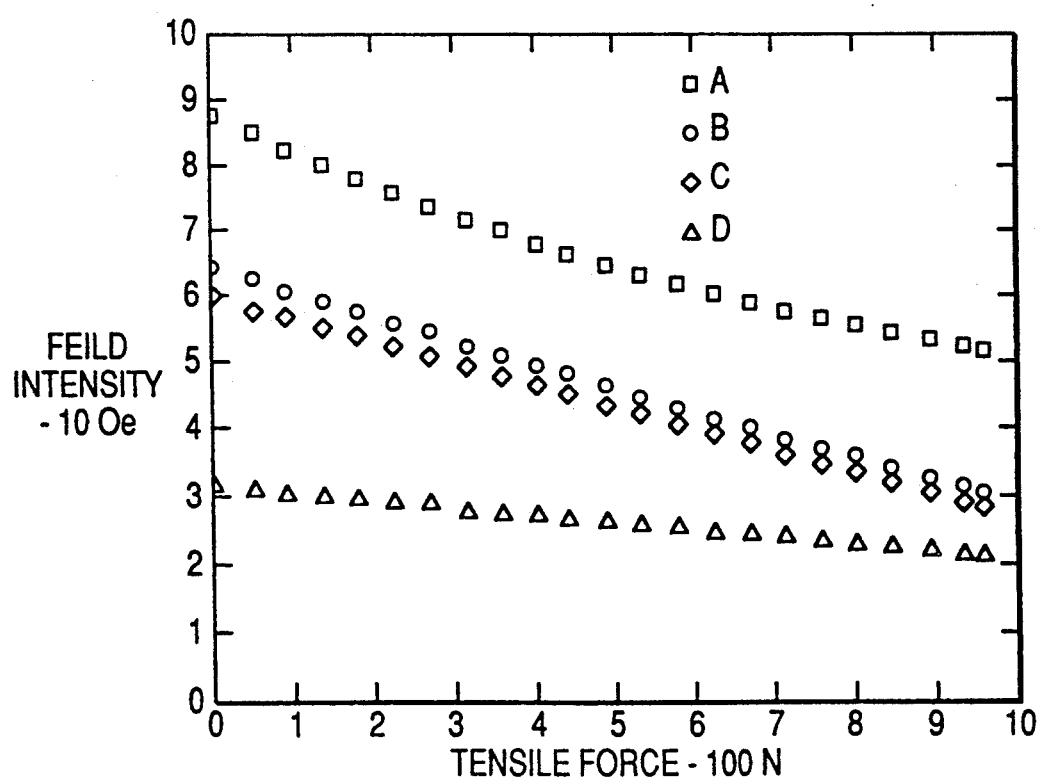
FIG. 36 is a graphical illustration of field intensity against tensile loading for experimental force transducers constructed in accordance with the present invention.

FIG. 36 shows the variation in measured field intensity with tensile load for the four (4) different cores. The data shows the expected monotonic decrease in field with increasing tension, attesting to the growth in the bulk moment of the core. The consistent decrease in field with increasing wall thickness manifests the greater bulk moment associated with the larger volumes of polarized material. The smaller changes in field intensity per unit load, with increasing wall thickness, are consistent with the associated lesser changes in stress per unit load. The diminishing slope at the higher loads, seen clearly in the data for the A core, and to a lesser extent for the B core (the two cores with the thinnest walls), signifies the approach to saturation of the bulk moment as all of the domain magnetizations become more nearly aligned with the core axis. (As the angle $\Theta$ approaches zero, $d(\cos\Theta)/d\Theta$ also approaches zero).

Figure 37:
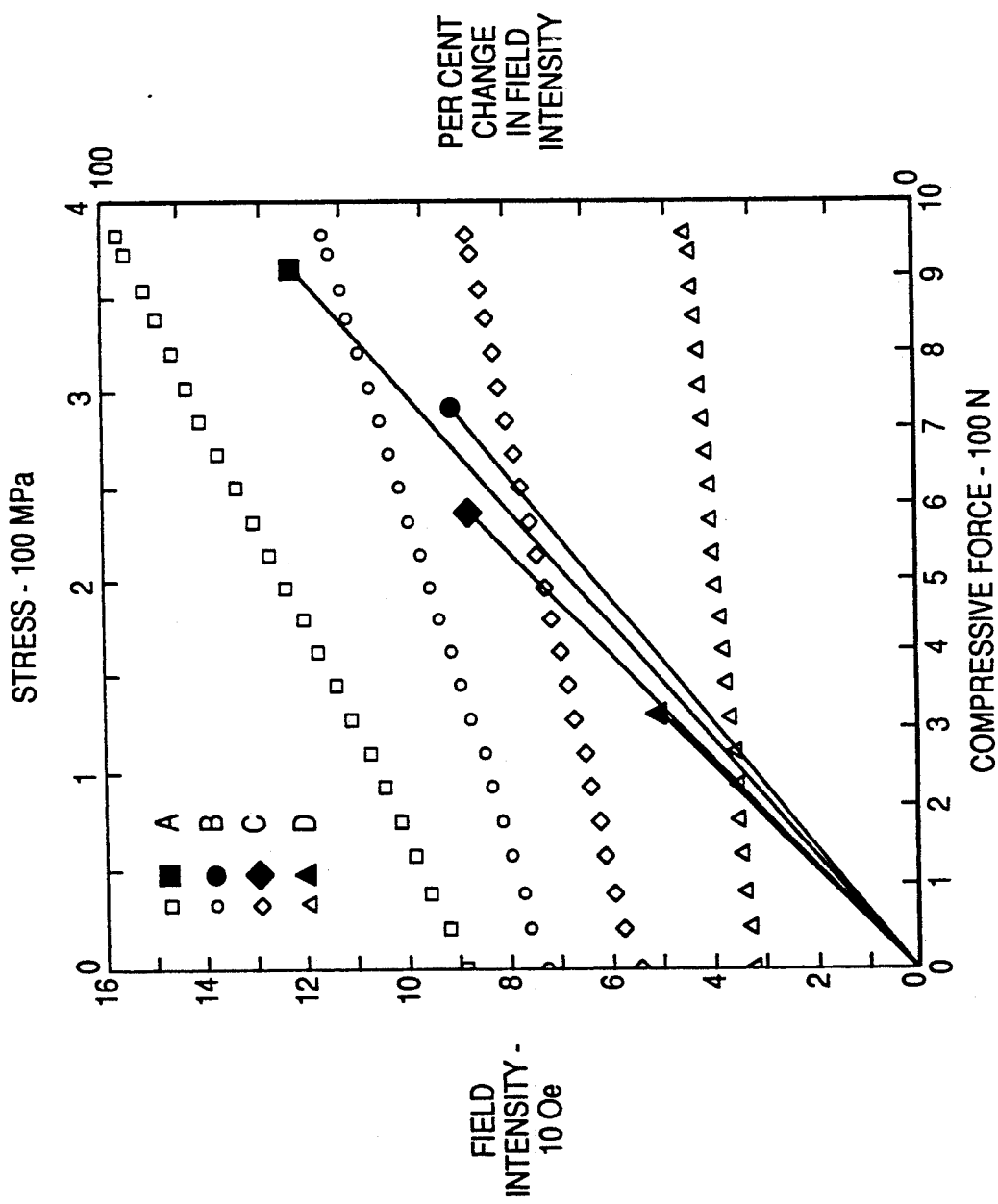
FIG. 37 is a graphical illustration of field intensity against compressive loading for experimental force transducers constructed in accordance with the present invention.
Figure 38A:
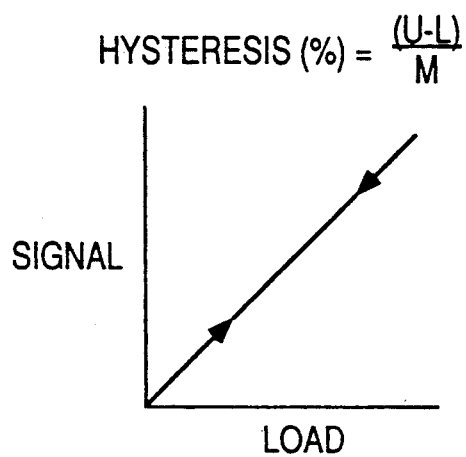
FIGS. 38a-38d are graphical illustrations of a variety of hysteresis manifestations.
Figure 38B:
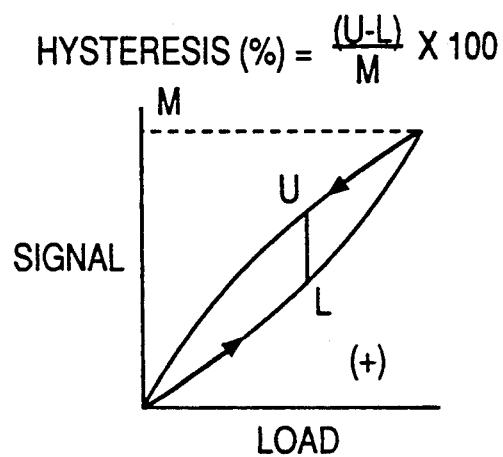
Figure 38C:
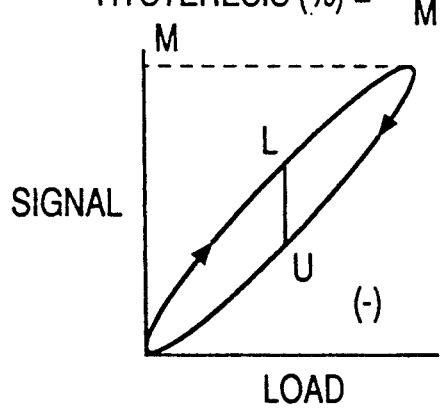
Figure 38D:
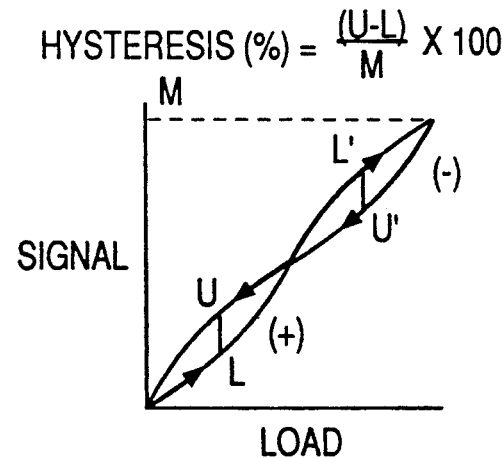

As seen in FIG. 37, the field intensities for all four (4) samples increase with increasing compressive load. Wall thickness variation has the same effects as with tension, for the same reasons. There is no indication of saturation in this range of compressive loads. (Since $d(\cos\Theta)/d\Theta$ increases with increasing $\Theta$, we would expect to see an eventual increase in slope prior to a relatively abrupt saturation when all the domains are at 90° to the core axis. Other effects also contribute to this asymmetry in the approaches to saturation by tensile and compressive stresses.) The C and D cores exhibited the same variation in field (but of opposite sign) for both tension and compression.

The solid lines in FIG. 37 show the percentage increase of the initial field intensity vs stress for each core. Because of the excellent linearity of the compression data, these normalized plots are drawn as straight lines from the origin to the point of peak stress, leaving out the intermediate data points. The remarkable similarity in the slopes of these lines supports the assumed basis for the operation of the device. (The change in the bulk moment of each core is proportional to the change in the volume weighted average of $\cos\Theta$ over all of the domains. Considering that they all have the same initial distributions and quiescent anisotropies, a given stress will always have the same reorienting effect, resulting in the same change in $\cos\Theta$).

The field intensities during unloading did not usually coincide exactly with the values (at corresponding loads) recorded for increasing loads. This hysteresis in the transfer function was found to vary, in both sign and magnitude, with type of load and with wall thickness. (Hysteresis reflects irreversibilities in the storage, exchange and release of elastic, magnetic and magnetoelastic internal energies.) Unlike some of the more familiar hysteretic phenomena (e.g., stress-strain cycles in polymers and B-H loops), the area enclosed on an Output/Stress plot does not represent (real) energy since the coordinates are only parametrically related. The hysteresis in the transfer functions of magnetoelastic transducers is as often found to be "negative" as "positive". The distinction is illustrated in FIG. 38 in which (a) illustrates an anhysteretic (ideal) response; (b) illustrates positive hysteresis, i.e., the signal during unloading (U) is larger than during loading (L); (c) illustrates negative hysteresis, i.e., U is smaller than L; and (d) illustrates mixed hysteresis. The core with the thinnest wall (A) exhibited the largest negative hysteresis: −3.5% in tension and −2.0% in compression. Hysteresis became consistently more positive with increasing wall thickness, reaching the same +2.0% for the "D" core, under both tensile and compressive loading.

Figure 34:
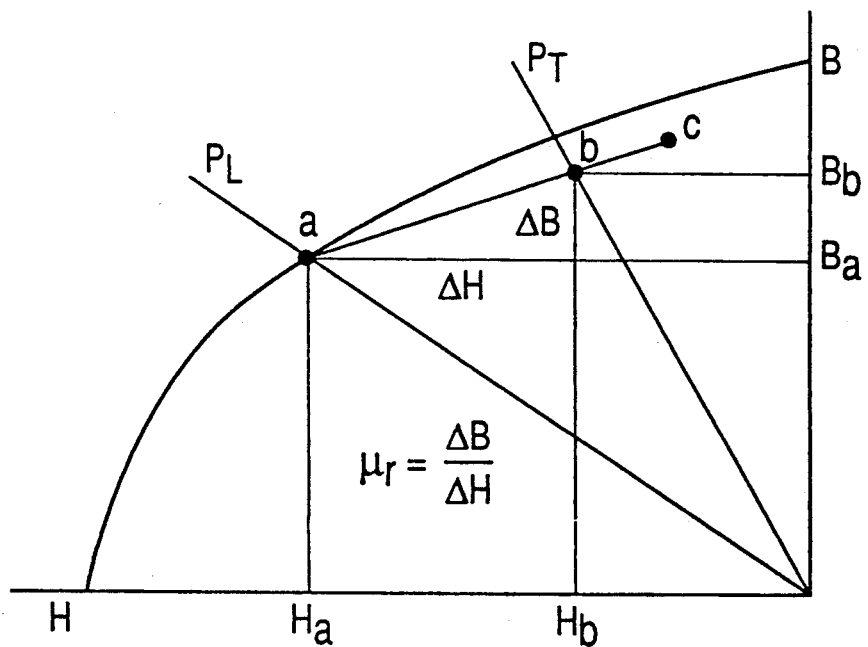
FIG. 34 is a graphical illustration of the demagnetization curve of a permanent magnet.

These unusually low (for magnetic phenomena) values of hysteresis further support the conceptual image of stress opposing the quiescent anisotropy for control of the orientation of the local magnetic moments. The substantial shrinkage in the active area of domain walls by the polarizing field effectively eliminates the major source of irreversibility from further magnetization altering processes. Thus the more "normal" positive hysteresis in the cores having greater cross sections reflects the reduced ability of the magnet to fully annihilate the 180° domain walls necessary to achieve an ideal polarization. For the arrangement of PM, core and FS used in these transducers, the positive hysteresis in the actual minor loop of the PM (the single line shown in FIG. 34 is a simplification) subtracts from the hysteresis in the core, thereby contributing a negative influence.

In order to demonstrate and verify the observations and conclusions contained herein, the variation of the magnetic properties of commercial 18% Ni maraging steels with stress was explored. The Ni maraging steels were selected because the usually restrictive correlation between mechanical strength and magnetic hardness is absent in the Ni maraging steels and this circumstance, together with the substantial retention of their outstanding strength properties and the relative constancy of their magnetic properties at temperatures up to about 425° C., has encouraged the development of magnetic grades suitable for use in highly stressed, flux carrying members of advanced rotating machinery.

Nevertheless, attention has not been specifically drawn to the unusual, often inverse effects on mechanical and magnetic hardness when these steels are cold worked or thermally treated. Neither has it been generally appreciated that the Ni/Fe ratio in the martensite which forms the foundation matrix in the 18% Ni maraging steels is close to that composition having the greatest, positive saturation magnetostriction of any alloy in the Ni-Fe binary system ($\lambda_s > 32$ ppm). Moreover, since the crystal anisotropy in this binary alloy composition range is only 20–25% of that found in iron or steels with low alloy content, it is expected that mechanical stress should markedly influence the magnetic properties of these maraging steels.

Experiments were conducted to examine the variation of magnetic properties with tensile and torsional loading as well as with composition and metallurgical condition. The tests were conducted using wire samples of the following two commercial alloys.

| Alloy | Ni | Co | Mo | Ti | Al | C | Fe |
|---|---|---|---|---|---|---|---|
| T-250 | 18.5 | 0 | 3.0 | 1.4 | .10 | .03 max | Bal. |
| U-300 | 18.5 | 9.0 | 4.8 | .6 | .10 | .03 max | Bal. |

| | Yield Strength | Ultimate Strength |
|---|---|---|
| T-250 | 655/1758 MPa | 965/1793 annealed/aged |
| U-300 | 758/1931 | 1034/1972 |

Preparation: A forged billet of double vacuum melted T-250 alloy was hot rolled to 7.14 mm dia. and subsequently cold drawn and annealed, as required, to 1.83 mm dia. wire. After a final anneal it was cold drawn to 1.60, again to 1.42 mm dia. and lastly, centerless ground to 1.27 mm dia.

The U-300 sample was not ground; the last processing step being a cold reduction of 12% to 1.58 mm dia.

These alloys are representative of titanium strengthened grades (T-250) and cobalt strengthened grades (U-300) of the commercially available 18% Ni maraging steels. Steels exhibiting equal strengths are available in both grades.

Wire samples were used as a matter of convenience. They could be highly stressed in both tension and torsion by relatively small mechanical forces using simple apparatus from which the samples could be easily removed and subsequently reinserted following thermal treatments. The use of long slender specimens also avoids troublesome demagnetizing effects.

Tension was applied by means of stackable weights and a simple lever system. Torsional loading was accomplished simply by a measured angular twist. The use of applied strain rather than stress is not consequential to the results being reported here.

Magnetic measurements were made in a conventional manner. The 610 mm long specimens (530 mm between loading grips) passed axially through a vertical, 400 mm long solenoid excited by 0.005-0.05 Hz triangular current waves. The magnetization changes in the sample were determined by integrating the difference in the voltages induced in centrally located B and H sense coils. The ac susceptibility, $X_{ac}$ was determined from the amplitude of the difference voltage appearing across the sense coils when a 500 Hz sine wave of small amplitude was superposed on the triangle wave. M vs H and $X_{ac}$ vs H were plotted with an X-Y recorder.

Figure 27:
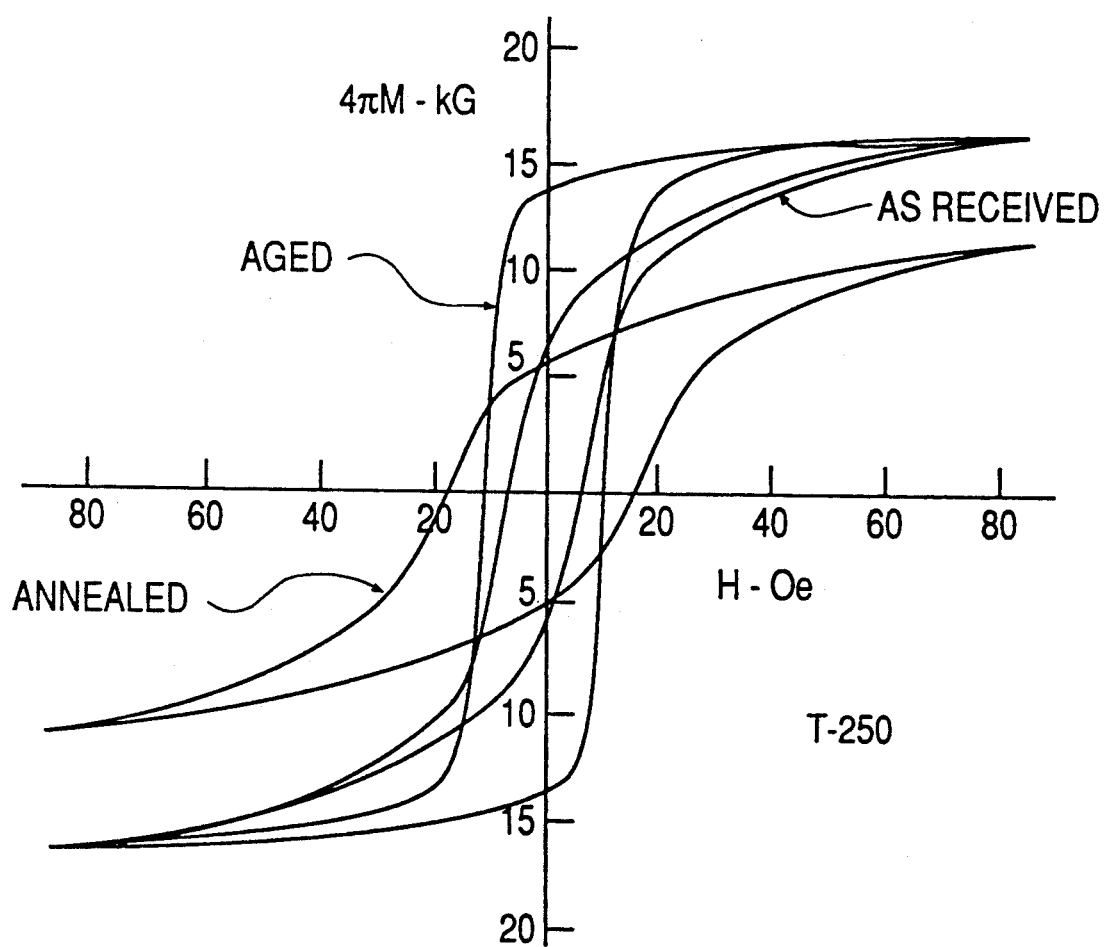
FIG. 27 is a graphical illustration of a hysteresis loop for T-250 Ni maraging steels in various metallurgical conditions.
Figure 28:
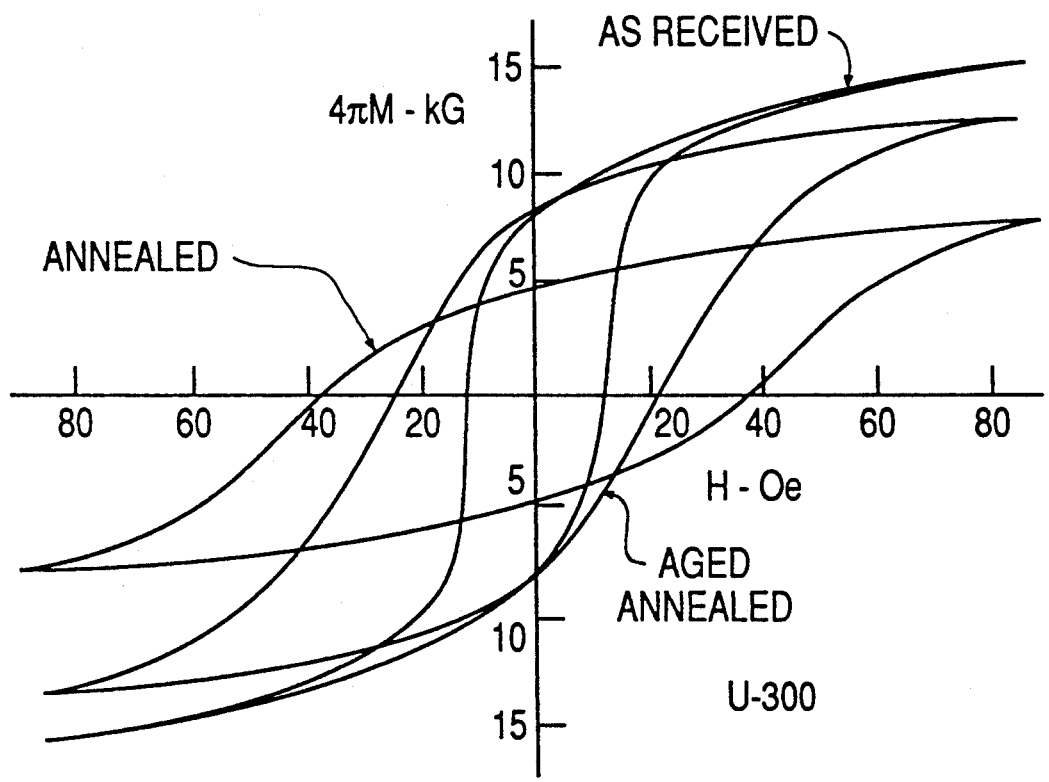
FIG. 28 is a graphical illustration of a hysteresis loop for U-300 Ni maraging steels in various metallurgical conditions.

Quasistatic hysteresis loops are shown in FIGS. 27 and 28 for the cold worked (as received), aged (480° C. for 40 minutes) and annealed (815° C. for 40 minutes) conditions of each alloy. While the relative response of both materials to these treatments is similar, the U-300 alloy showed consistently higher $H_c$ and reduced $M_{max}$ than the similarly treated T-250 alloy. This would seem a normal consequence of the higher content of nonmagnetic elements in U-300. Both alloys showed the unusual characteristic of having their lowest values of $H_c$ in the cold worked condition and the highest in the annealed condition.

Heretofore, it had been suggested that this effect manifested the existence of retained austenite in the annealed state that is transformed by plastic strain to ferromagnetic martensite. The decrease in $H_c$ and increase in $M_{max}$ by short time aging of annealed specimens had been attributed to the partial recovery of the martensitic structure. These earlier workers, apparently unaware of the strong magnetoelastic interaction in these materials, ignored the possible influence of residual stress in explaining the action of such processing on magnetic properties.

Figure 29A:
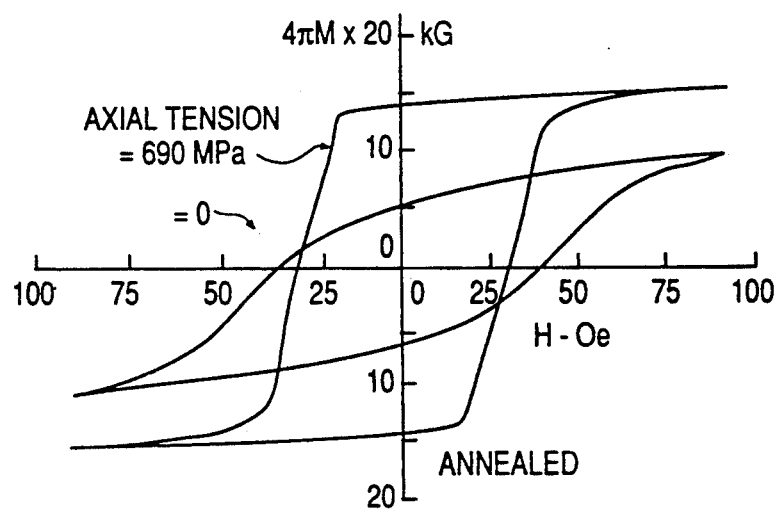
FIG. 29a is a graphical illustration of the effect of tensile stress on the hysteresis loops of U-300 alloy following annealing.
Figure 29B:
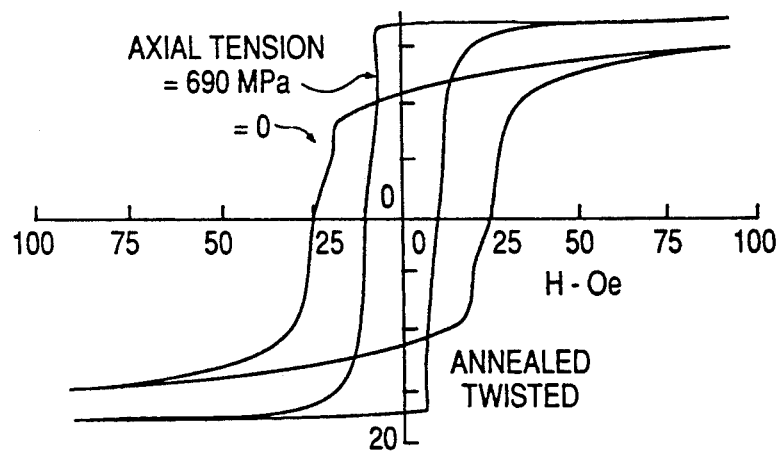
FIG. 29b is a graphical illustration of the effect of tensile stress on the hysteresis loops of U-300 alloy following annealing and twisting.
Figure 29C:
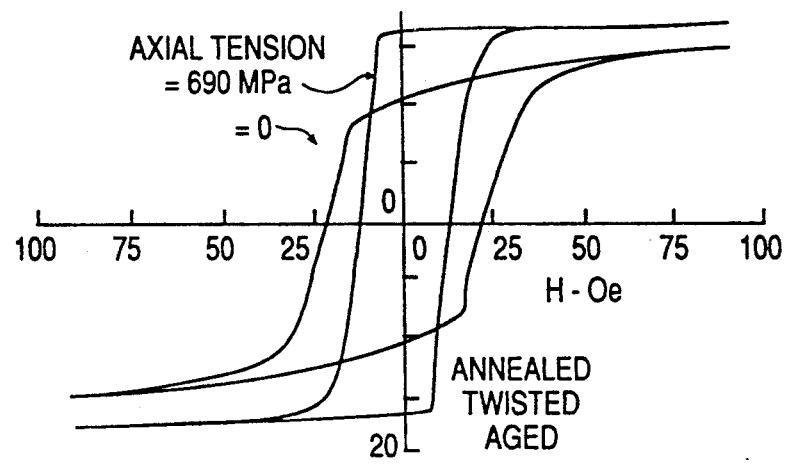
FIG. 29c is a graphical illustration of the effect of tensile stress on the hysteresis loops of U-300 alloy following annealing, twisting and aging.

Clear evidence of the remarkable extent to which stress affects the magnetization of these materials is seen in FIGS. 29a, 29b and 29c. For the three metallurgical conditions shown, the consistent effect of uniaxial tension was to heighten, narrow and square their respective quiescent M-H loops. Similar featural differences are seen between the zero tension loops in FIG. 29b and FIG. 29a, although there is less flattening of the top and bottom limbs.

It now seems reasonable to attribute at least part of these featural differences to the residual stress distribution that has been instilled in the FIG. 29(b) specimen by the torsional overstrain indicated. As the magnetization direction in each grain is moved towards alignment with the stress axis, the material becomes magnetically more homogeneous. The pinning effects of grain boundaries is thereby reduced; magnetization reversal becomes more coherent as manifested by the steepening of the loops. The effective field acting on any domain wall is a cosine function of the angle between the domain magnetization and the fields. As this angle approaches zero in each domain the coercive force will therefore be reduced. As the irreversible processes thus become facilitated by the increasing stress anisotropy so too are the opportunities for reversible magnetization processes diminished.

This is clearly shown by the one-half of the butterfly loops of FIGS. 30a, 30b and 30c, which plot H against reversible susceptibility, $X_{ac}=dM/dH$. A tensile stress of 690 MPa (690 megapascals=100,000 pounds per square inch) is seen to have an enormously greater effect on reducing $X_{ac}$ than even a 90 Oe field applied to the zero tensile stress material. Since the recorder was heavily damped only a hint of the large Barkhausen jumps occurring during reversal is seen in these figures. The effects shown here are qualitatively reproduced with the T-250 alloy.

Figure 31:
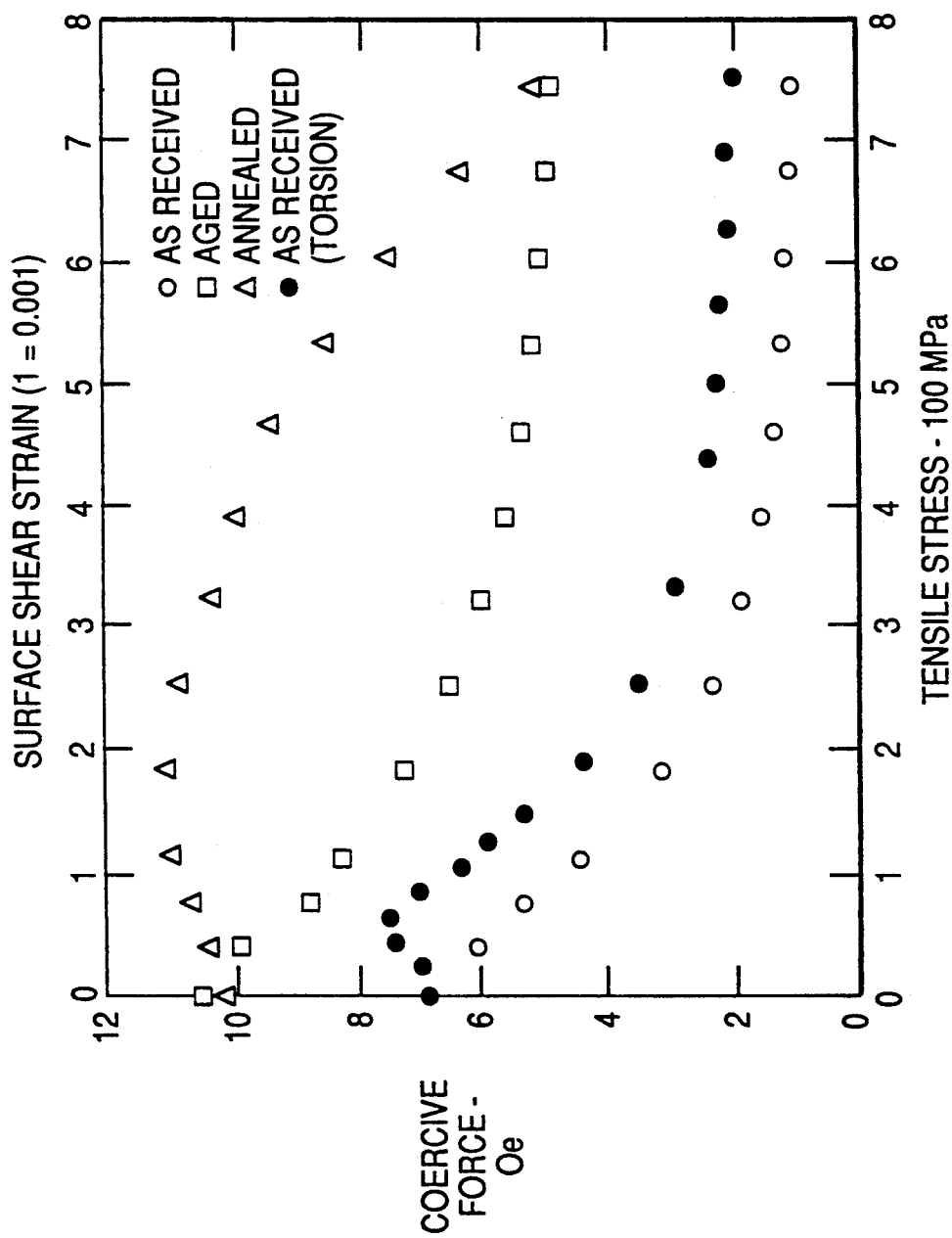
FIG. 31 is a graphical illustration of the variation of coercive force with stress in T-250 alloy.

Quantitative changes in coercive force, $H_c$, are shown in FIG. 31 for each of the as received or aged or annealed conditions. The effects of torsion are also shown in this FIG. 31. The rise and subsequent fall of the coercive force with increasing shear strain attests to the presence of a residual torsional stress in the as received wire. This is a natural consequence of its processing wherein it is often twisted on its axis as it is uncoiled during cold drawing.

Figure 32:
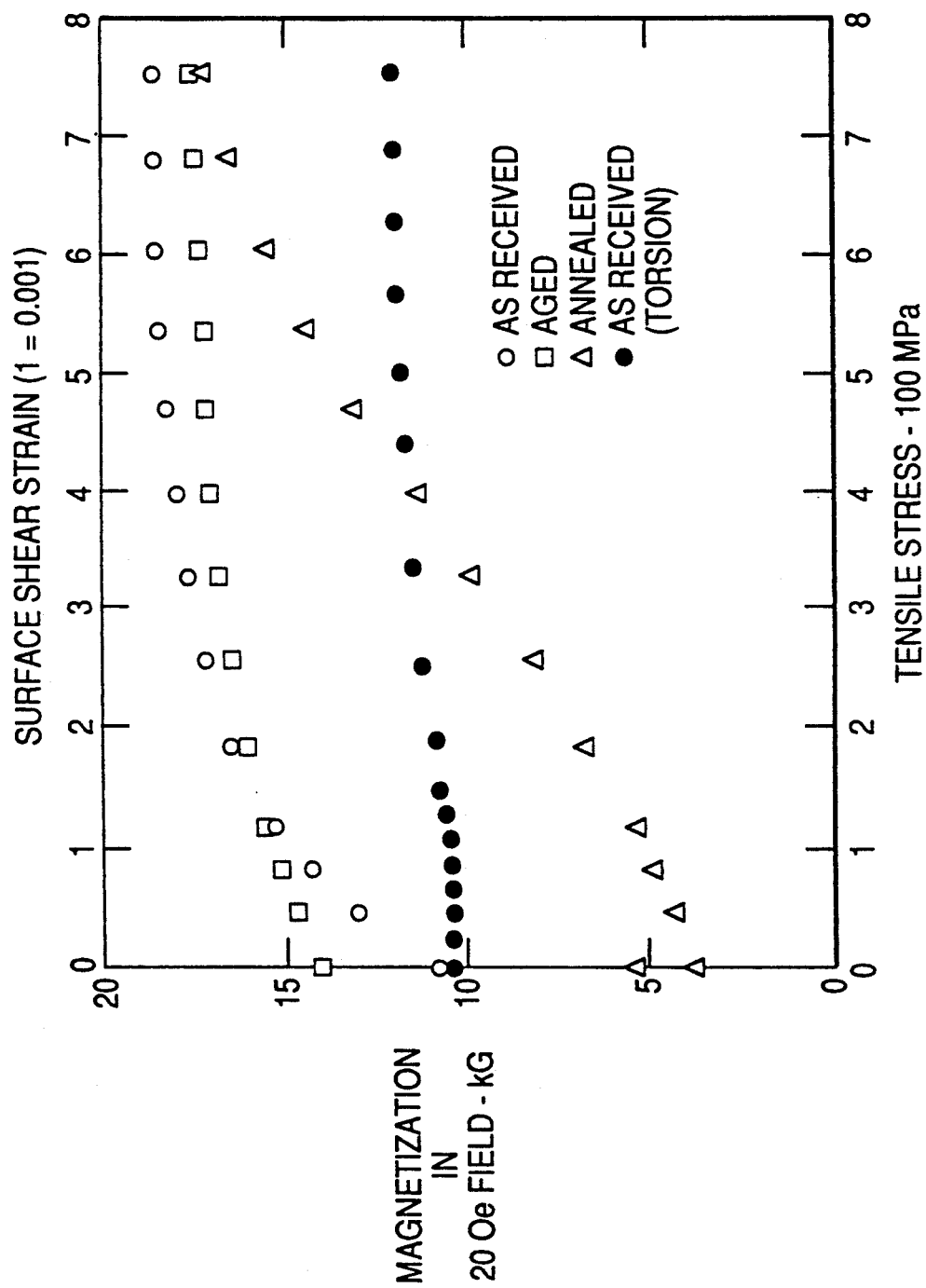
FIG. 32 is a graphical illustration of the variation of magnetization with stress in T-250 alloy.

Quantitative variation with tensile stress, of the peak magnetization, $M_{20}$, reached during the quasistatic cyclic applications of +20 Oe fields, is shown in FIG. 32. The effects of torsion are also shown. The highest stress (743 MPa) was above the yield strength of the annealed sample and, therefore, the peak magnetization returned to a higher value than its initial value as shown by the solid triangle at 5.5 kG.

This data confirm that the magnetic properties of the 18% Ni maraging steels in low and moderate fields are dominated by stress. The influence of stress anisotropy is manifested in every salient feature of both reversible and irreversible magnetization processes. Moreover, the data also confirm the practicality of sensing reversible and irreversible processes and correlating the resulting signal to the applied external force in sensors for force related parameters, e.g., load, torque, pressure and acceleration. The high magnetostrictive sensitivity and mechanical strength of the 18% Ni maraging steels recommends this material, in particular, for use in such sensors.

I claim:

1. A force transducer for providing a signal indicative of the magnitude of an external force applied to a ferromagnetic member, the external force causing tensile and/or compressive stresses to arise in said member, the transducer comprising:
   (a) permanent magnet means for creating a polarizing magnetic field;
   (b) sensor means for sensing the magnetic field intensity at said sensor means;
   (c) said member being fixedly positioned relative to said magnetic field creating means and said sensor means for conducting a portion of the magnetic flux through said member, the amount of member-conducted magnetic flux being a function of the stressed condition of said member and of the applied force creating said stressed condition, said sensor means sensing a portion of the flux not conducted through said member (leakage flux), said magnetic field creating means, sensor means and member being positioned sufficiently close to one another to cooperatively provide the sensitivity functionally required for applied force-induced flux changes; and
   (d) means for converting said sensed leakage flux into a signal proportional to the magnitude of the force applied to said member.

2. A force transducer, as claimed in claim 1, wherein said sensing means comprises means for producing an electrical output proportional to a sensed magnetic field intensity.

3. A force transducer, as claimed in claim 2, wherein said sensing means comprises a Hall effect sensing device.

4. A force transducer, as claimed in claim 2, wherein said sensing means comprises a magnetoresistive sensing device.

5. A force transducer, as claimed in claim 1, wherein said member is positioned between said magnetic field creating means and said sensing means.

6. A force transducer, as claimed in claim 1, wherein said sensing means is positioned on the same side of said member as said magnetic field creating means.

7. A force transducer, as claimed in claim 1, wherein said member is formed of 18% nickel maraging steel.

8. A force transducer, as claimed in claim 5, wherein said member is formed of 18% nickel maraging steel.

9. A force transducer, as claimed in claim 6, wherein said member is formed of 18% nickel maraging steel.

10. A method for sensing the magnitude of an external force applied to a ferromagnetic member, the external force causing tensile and/or compressive stresses to arise in said member, the method comprising:
    (a) creating a polarizing magnetic field;
    (b) fixedly positioning said member relative to the magnetic field for conducting a portion of the magnetic flux through said member, the amount of member-conducted magnetic flux being a function of the stressed condition of said member and of the applied force creating said stressed condition;
    (c) fixedly positioning a magnetic field intensity sensing means relative to said magnetic field for sensing a portion of the flux not conducted through said member (leakage flux); and
    (d) converting said sensed leakage flux into a signal proportional to the magnitude of the force applied to said member.

11. A method, as claimed in claim 10, wherein said steps of positioning said member and sensing means comprises positioning said member between means creating said magnetic field and said sensing means.

12. A method, as claimed in claim 10, wherein said steps of positioning said member and sensing means comprises positioning said sensing means on the same side of said member as the means creating said magnetic field.

13. A method, as claimed in claim 10, including the step of forming said member of 18% nickel maraging steel.

14. A method, as claimed in claim 11, including the step of forming said member of 18% nickel maraging steel.

15. A method, as claimed in claim 12, including the step of forming said member of 18% nickel maraging steel.

* * * * *